United States Patent [19]
Shibayama et al.

[11] Patent Number: 5,353,163
[45] Date of Patent: Oct. 4, 1994

[54] WIDE-ANGLE ZOOM LENS

[75] Inventors: Atsushi Shibayama; Masahiro Nakatsuji, both of Kawasaki, Japan

[73] Assignee: Nikon Corporation, Tokyo, Japan

[21] Appl. No.: 912,718

[22] Filed: Jul. 13, 1992

[30] Foreign Application Priority Data

Jul. 17, 1991 [JP] Japan .................. 3-176560
Feb. 21, 1992 [JP] Japan .................. 4-034778

[51] Int. Cl.$^5$ ............................... G02B 15/14
[52] U.S. Cl. .......................... 359/692; 359/795
[58] Field of Search ............ 359/784, 795, 717, 676, 359/685, 689, 692

[56] References Cited
U.S. PATENT DOCUMENTS

| | | | |
|---|---|---|---|
| 4,787,718 | 11/1988 | Cho .......................... | 359/692 X |
| 4,836,660 | 6/1989 | Ito ........................... | 359/692 |
| 4,844,600 | 7/1989 | Tokumaru ................. | 359/692 X |
| 4,929,069 | 5/1990 | Shibayama ................ | 359/692 |
| 4,936,661 | 6/1990 | Betensky et al. .......... | 359/692 |
| 5,126,884 | 6/1992 | Sato .......................... | 359/692 |
| 5,218,478 | 6/1993 | Itoh .......................... | 359/717 X |

*Primary Examiner*—William L. Sikes
*Assistant Examiner*—David R. Parsons
*Attorney, Agent, or Firm*—Shapiro and Shapiro

[57] ABSTRACT

A wide-angle zoom lens has a first lens group having a positive refracting power and a second lens group having a negative refracting power, which are moved relative to each other along the optical axis so as to attain zooming. The first lens group is constituted in turn from the object side by a front group having a negative refracting power and a rear group having a positive refracting power. The front group has at least one negative lens. The rear group has at least two positive lenses. The zoom lens is constituted to satisfy the following conditions:

$$0.75 < |f_F/f_W| < 4, f_F < 0$$

$$0.1 < K/f_W < 0.4$$

$$0.1 < L/f_W < 0.7$$

wherein $f_F$ is the focal length of the front group in the first lens group, $f_W$ is the focal length of the zoom lens at the wide-angle end, K is the axial distance from a lens surface at the extreme image-side end of the first lens group to a rear-side principal point of the first lens group when a direction toward the image side is defined as a positive direction, and L is the axial distance from a lens surface at the extreme object-side end of the front group in the first lens group to a lens surface at the extreme object-side end of the rear group in the first lens group.

57 Claims, 10 Drawing Sheets

WIDE-ANGLE ZOOM LENS

BACKGROUND OF THE INVENTION

1. Field of the Invention

The present invention relates to a zoom lens suitable for a compact camera and, more particularly, to a wide-angle zoom lens including a wide-angle area having a total field angle of 70° to 80° at the wide-angle end.

2. Related Background Art

In recent years, among zoom lenses for compact cameras, demands for zoom lenses having wider angles have increased. As a conventional zoom lens for a compact camera, a large number of zoom lenses, each of which consists of a first lens group having a positive refracting power, and a second lens group having a negative refracting power, performs zooming by changing the interval between the two lens groups, and has a field angle of about 60° at the wide-angle end, have been proposed. For example, zoom lenses disclosed in U.S. Pat. No. 4,929,069, and the like are known. However, when a wide field angle of 70° to 80° is to be obtained by a two-group zoom lens consisting of a first lens group having a positive refracting power and a second lens group having a negative refracting power, it is difficult to simultaneously assure a required back focal distance at the wide-angle end, and a required interval between first and second lens groups $G_1$ and $G_2$ at the telephoto end. For this reason, the demands for the zoom lenses having wider angles cannot be sufficiently met.

SUMMARY OF THE INVENTION

In order to meet the above-mentioned demands, the present invention has as an object to provide a wide-angle zoom lens, which maintains a simple structure suitable for a compact camera in a practical application, and has good imaging performance although it includes a wide-angle area having a field angle of about 70° to 80°.

In order to achieve the above object, a wide-angle zoom lens according to the present invention comprises a first lens group having a positive refracting power and a second lens group having a negative refracting power, which are moved relative to each other along the optical axis so as to change the group interval for the purpose of zooming. The first lens group having the positive refracting power is constituted by a front group having a negative refracting power and a rear group having a positive refracting power in turn from the object side. The front group has at least one negative lens, and the rear group has at least two positive lenses. Furthermore, the first and second lens groups are arranged to satisfy a predetermined condition.

In order to attain a wider field angle in the zoom lens constituted by the two, positive and negative lens groups described above, the positive first lens group and the negative second lens group have the above-mentioned arrangements, and the refracting powers of the first and second lens groups must be properly distributed so as to satisfy predetermined conditions.

According to the present invention with the above arrangement, there can be provided a wide-angle zoom lens, which has a field angle as wide as 70° to 80° while maintaining a compact structure, and has good imaging performance from the wide-angle end to the telephoto end.

Other objects, features, and effects of the present invention will be apparent from the following detailed description taken in conjunction with the accompanying drawings.

DESCRIPTION OF THE PREFERRED EMBODIMENTS

The preferred embodiments of the present invention will be described in detail hereinafter with reference to the accompanying drawings.

A zoom lens of each of the embodiments according to the present invention comprises a first lens group $G_1$ having a positive refracting power and a second lens group $G_2$ having a negative refracting power.

FIGS. 1, 2, 4, and 7 respectively show the first, second, fourth, and seventh embodiments of the present invention. In each of these embodiments, a front group $G_F$ in the first lens group is constituted by a negative meniscus lens $L_{F1}$ with a convex surface facing the object side. A rear group $G_R$ in the first lens is constituted by a positive meniscus lens $L_{R1}$ with a convex surface facing the object side, a negative combination lens, which is constituted by combining a double-concave negative lens $L_{R2}$ and a double-convex positive lens $L_{R3}$, and has a meniscus shape with a concave surface facing the object side as a whole, and a double-convex positive lens $L_{R4}$. The second lens group $G_2$ is constituted by a positive meniscus lens $L_{21}$ with a convex surface facing the image side, and a negative meniscus lens $L_{22}$ with a concave surface facing the object side.

Figure 3:
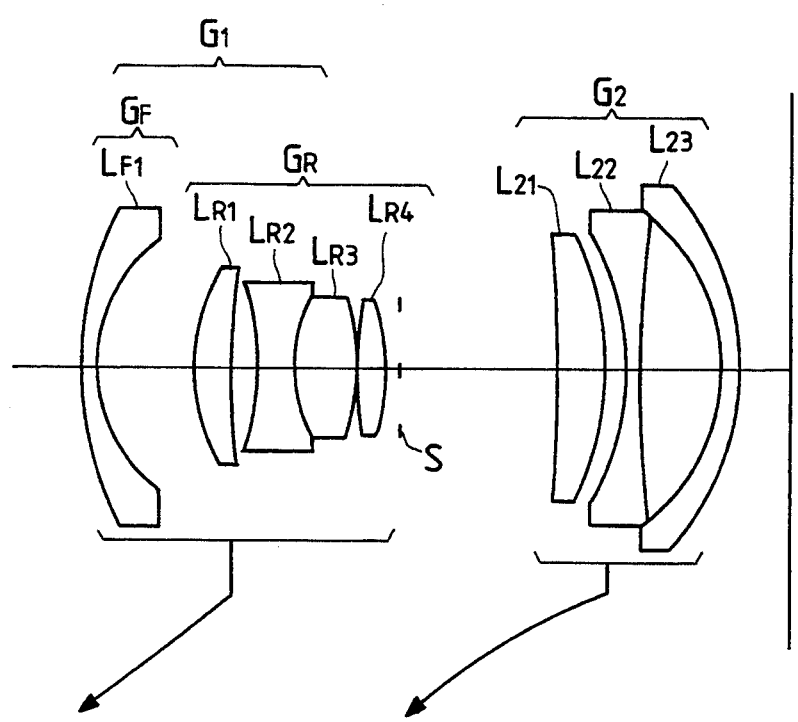
Figure 4:
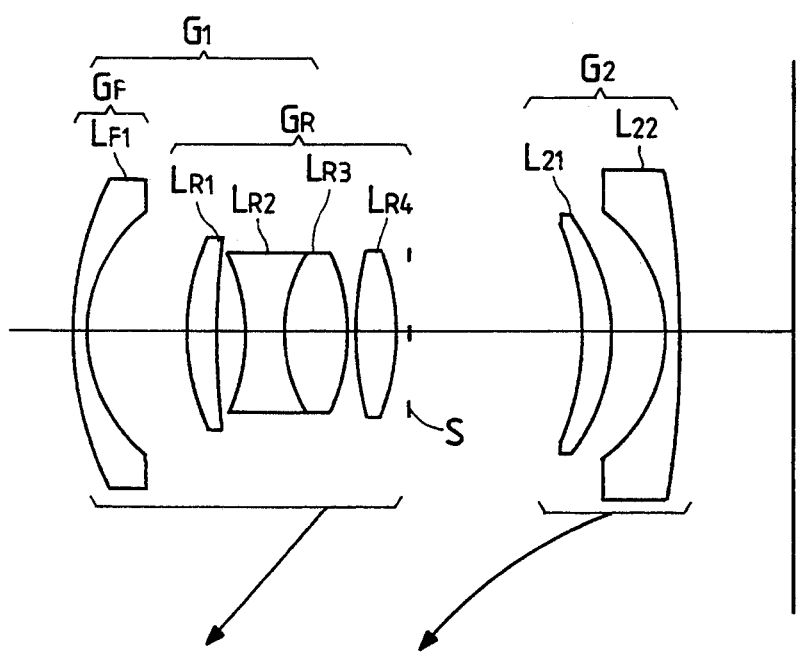
Figure 10:
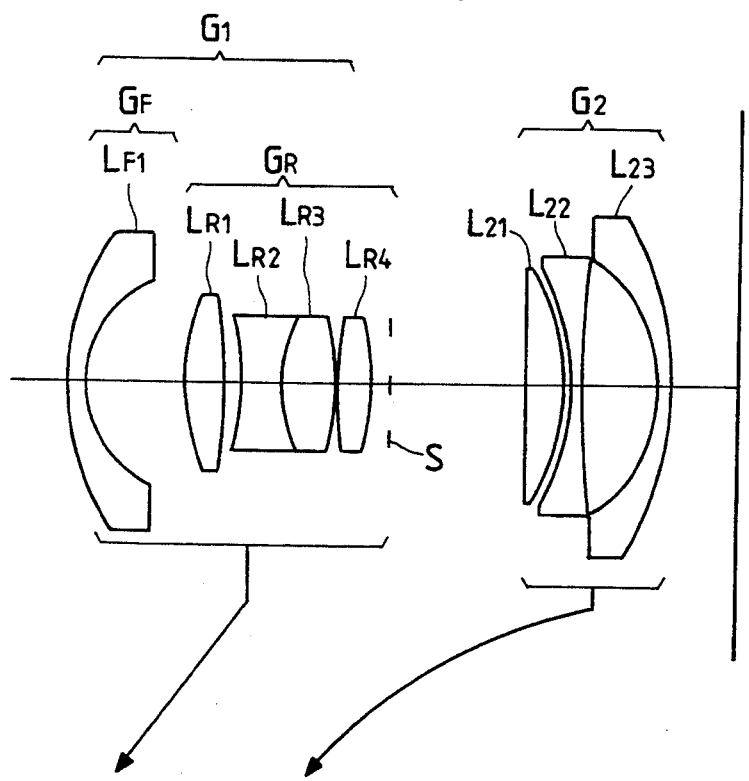
Figure 11:
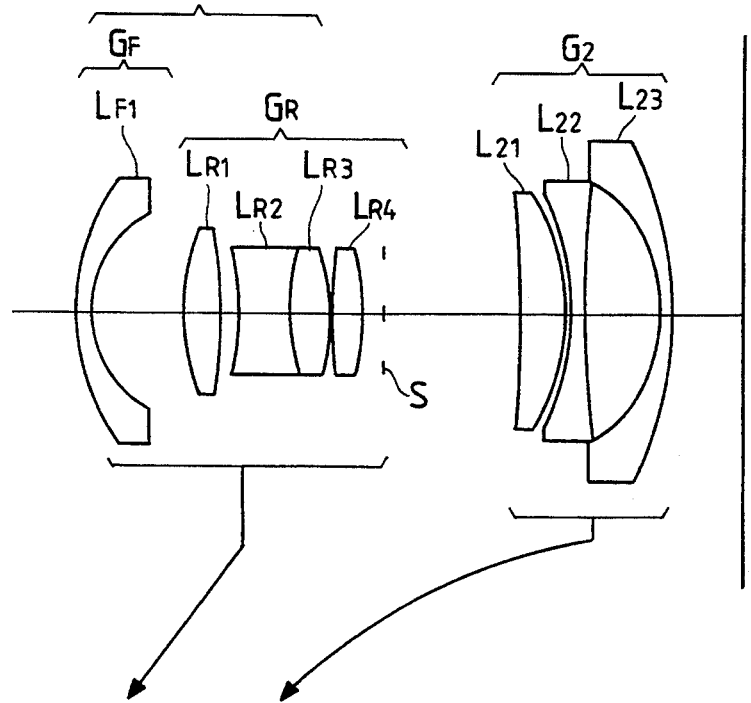

In each of the third, 10th, and 11th embodiments respectively shown in FIGS. 3, 10, and 11, the first lens group $G_1$ has basically the same lens arrangement as that of the first, second, fourth, and seventh embodiments. However, the second lens group $G_2$ is constituted by a positive meniscus lens $L_{21}$ with a convex surface facing the image side, a negative lens $L_{22}$ with a concave surface of a stronger curvature facing the object side, and a negative meniscus lens $L_{23}$ with a concave surface facing the object side.

Figure 5:
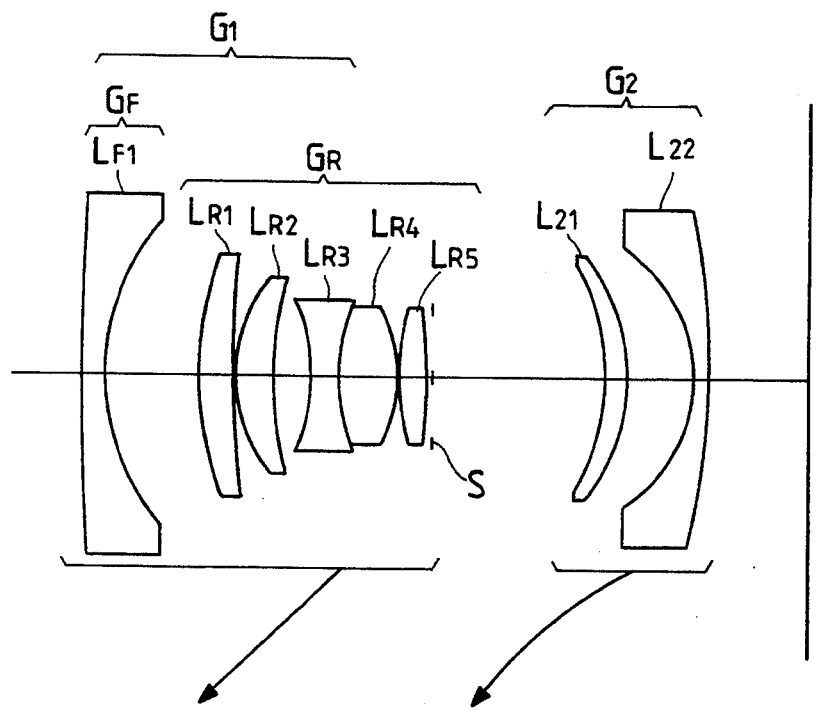
Figure 12:
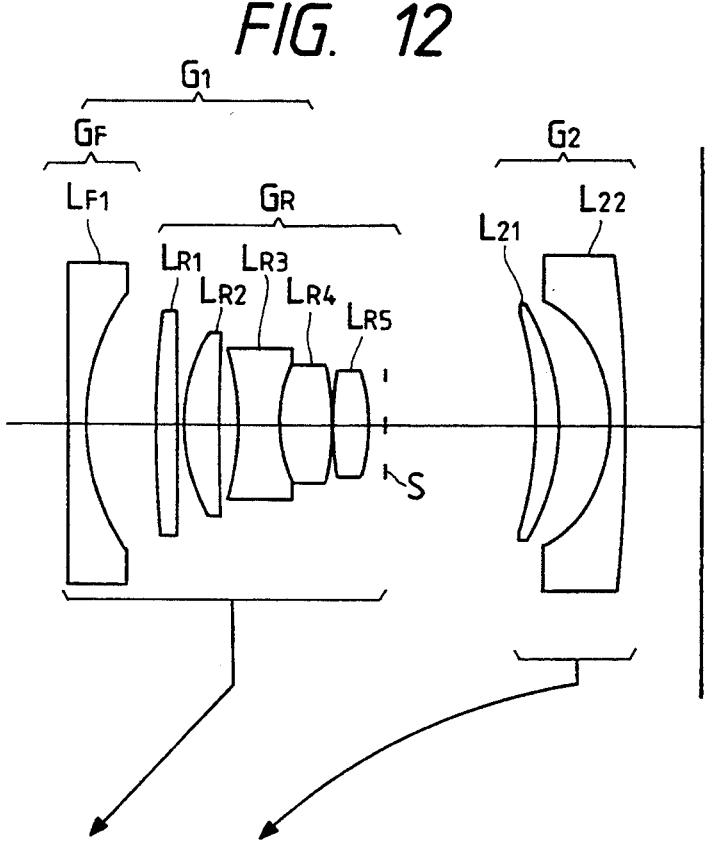

In each of the fifth and 12th embodiments respectively shown in FIGS. 5 and 12, the second lens group $G_2$ has basically the same lens arrangement as that in the first, second, fourth, and seventh embodiments. However, the front group $G_F$ in the first lens group $G_1$ is constituted by a negative meniscus lens $L_{F1}$ with a convex surface facing the object side or a negative lens $L_{F1}$ with a surface of a stronger curvature facing the image side. The rear group $G_R$ is constituted by five lenses, i.e., positive lenses $L_{R1}$ and $L_{R2}$ with convex surfaces facing the object side, a negative combination lens, which is constituted by combining a double-concave negative lens $L_{R3}$ and a double-convex positive lens $L_{R4}$, and has a meniscus shape with a concave surface facing the object side as a whole, and a double-convex positive lens $L_{R5}$.

Figure 6:
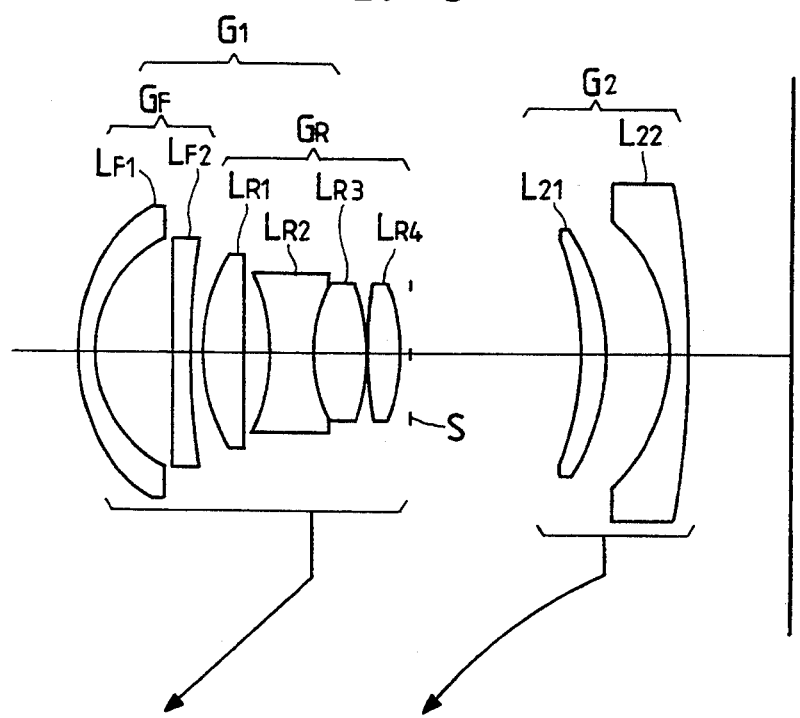
Figure 7:
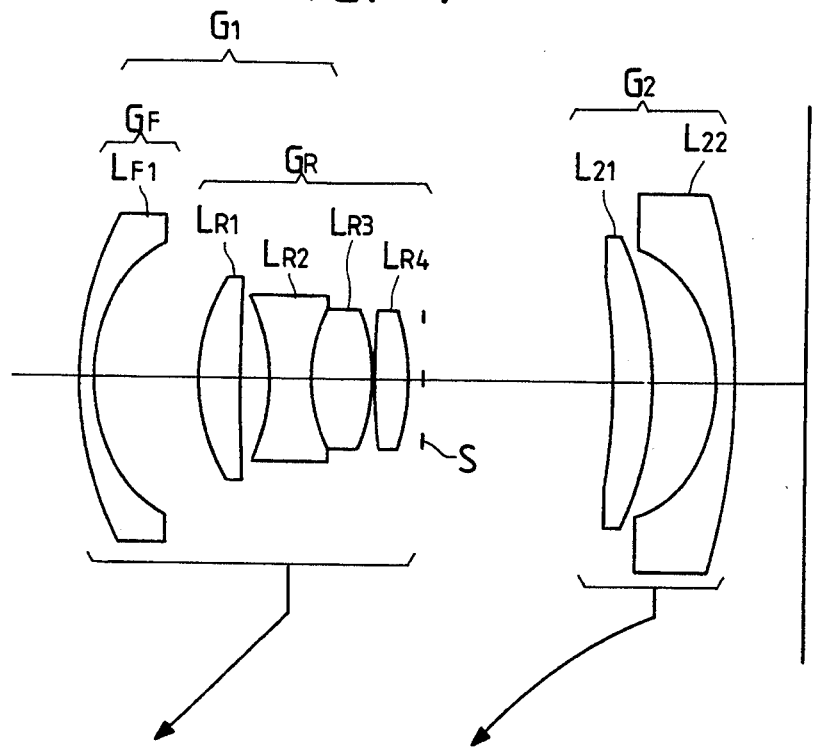

In the sixth embodiment shown in FIG. 6, the rear group $G_R$ in the first lens group $G_1$ and the second lens group $G_2$ have basically the same lens arrangements as those in the first, second, fourth, and seventh embodiments. The front group $G_F$ is constituted by two negative lenses, i.e., a negative meniscus lens $L_{F1}$ with a convex surface facing the object side, and a double-concave negative lens $L_{F2}$.

Figure 8:
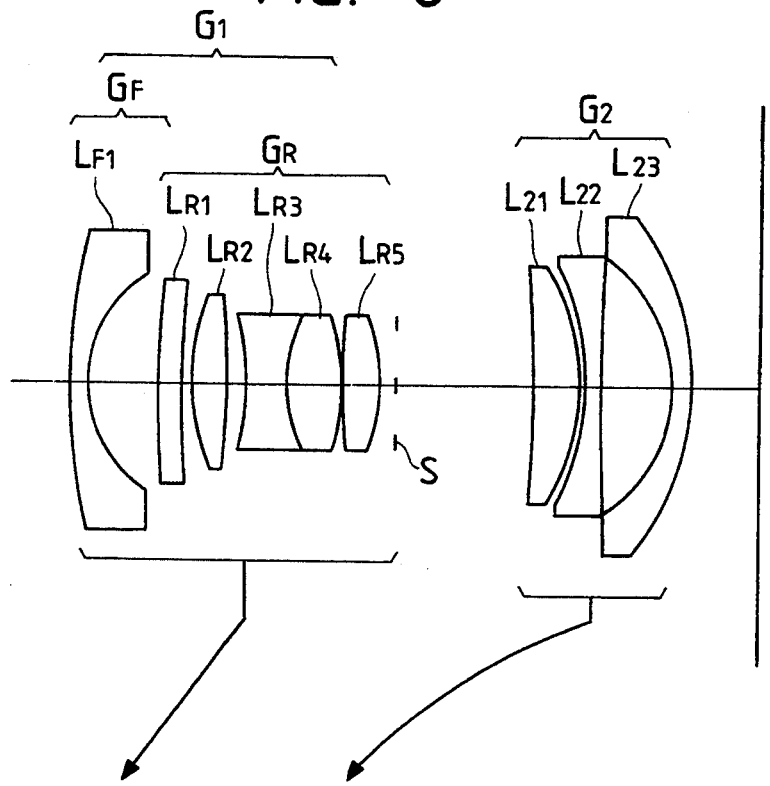
Figure 13:
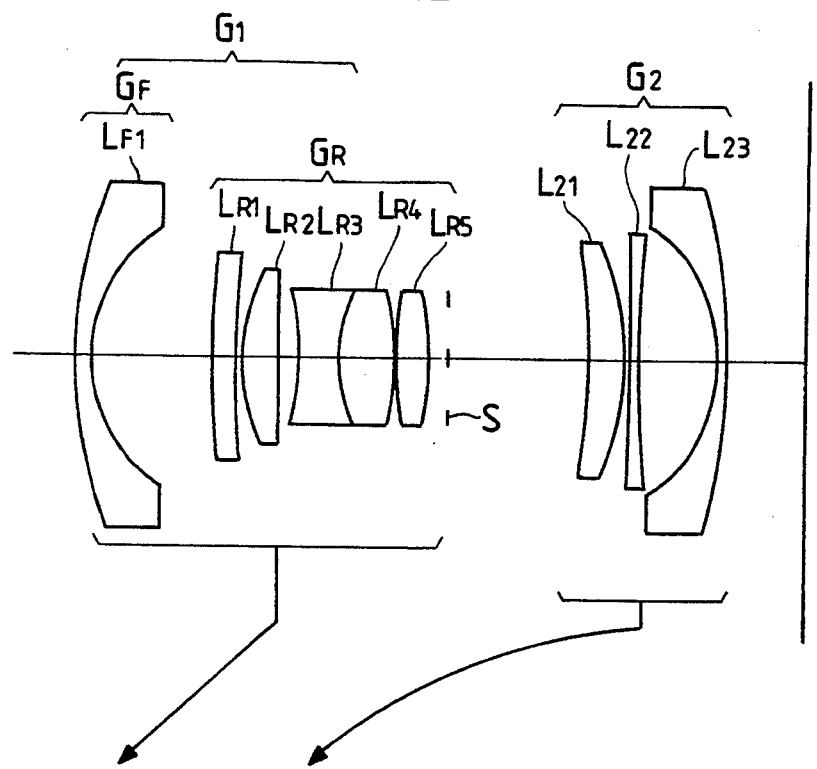
Figure 14:
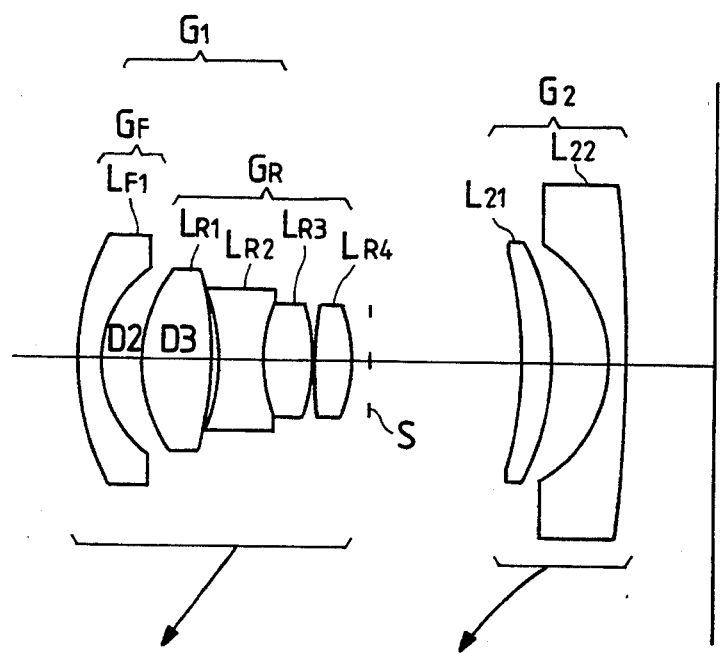
Figure 15:
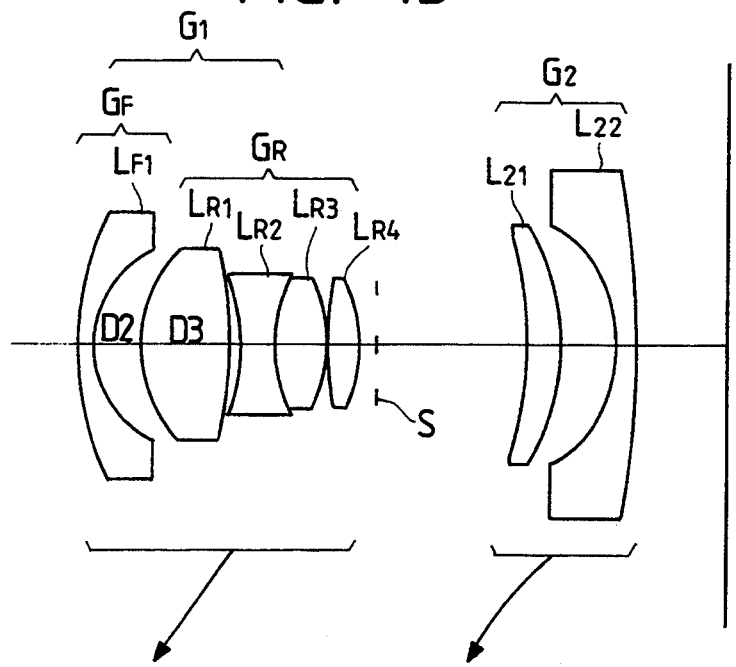
Figure 16:
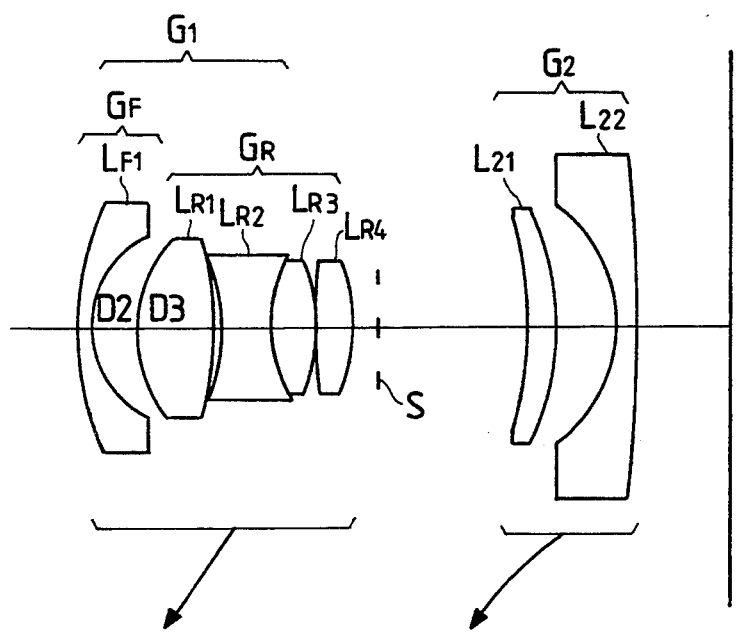
Figure 17:
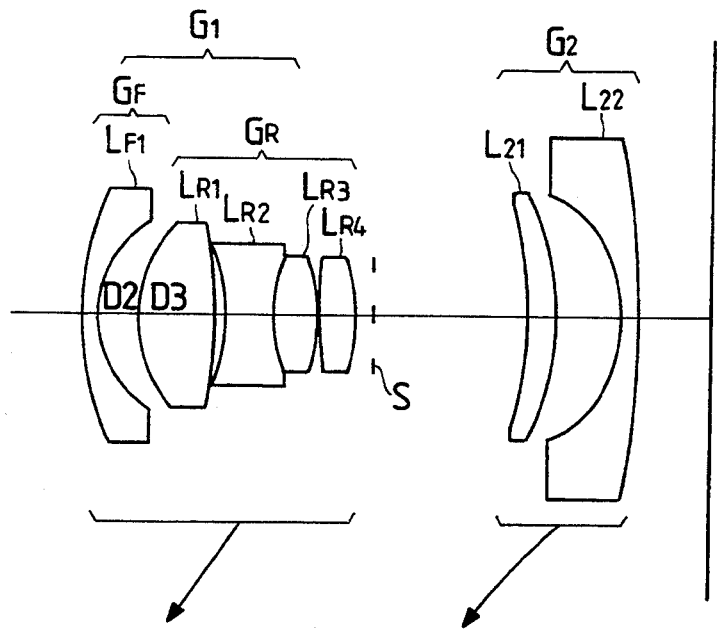
Figure 18:
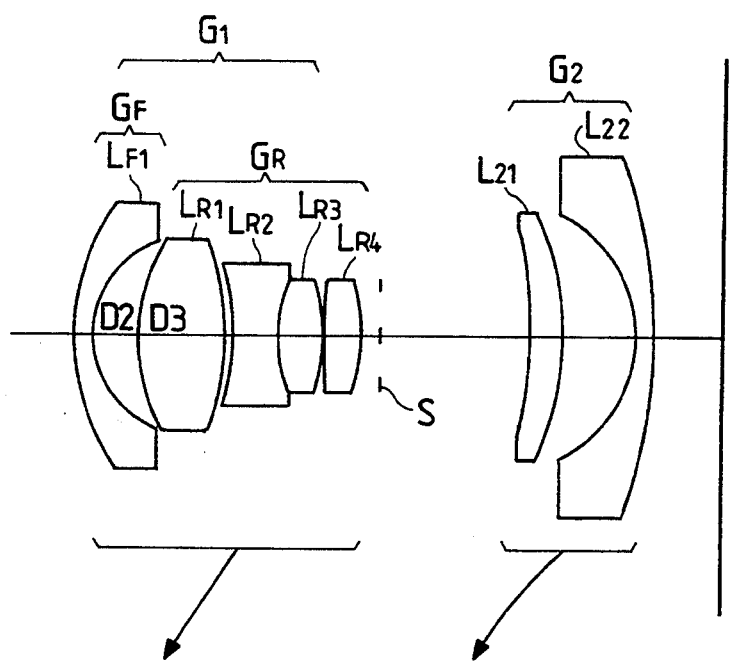
Figure 19:
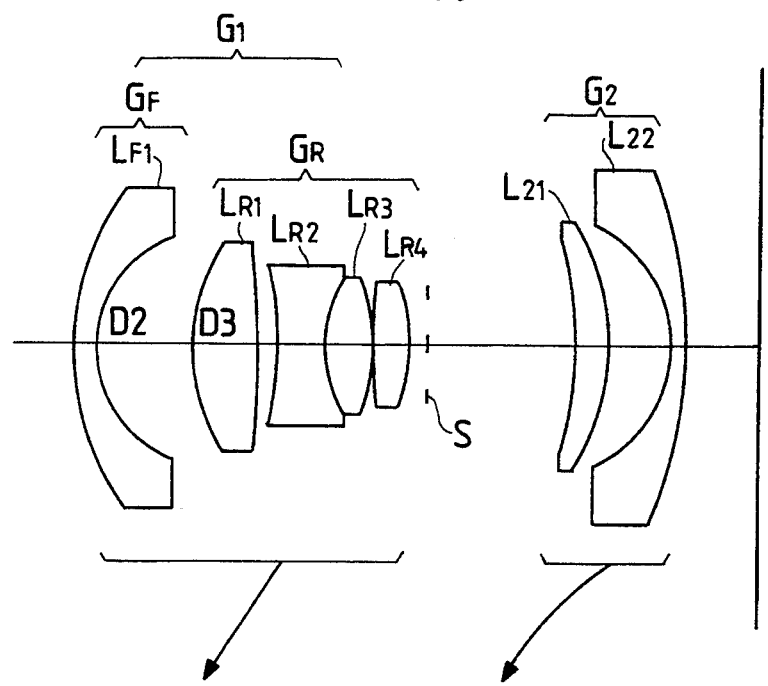
Figure 20:
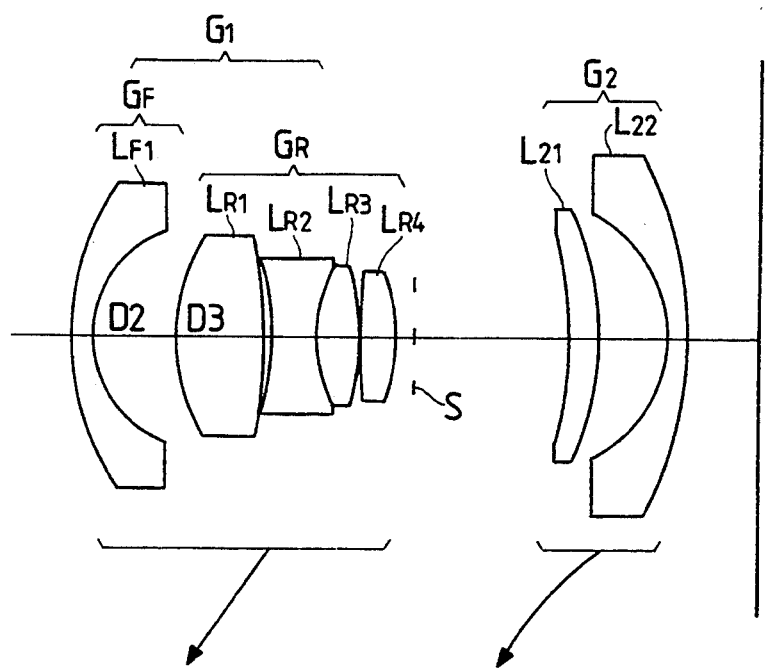

In each of the eighth and 13th embodiments respectively shown in FIGS. 8 and 13, the front group $G_F$ in the first lens group $G_1$ is constituted by a negative meniscus lens $L_{F1}$ with a convex surface facing the object side. The rear group $G_R$ is constituted by five lenses, i.e., positive lenses $L_{R1}$ and $L_{R2}$, a negative combination lens, which is constituted by combining a double-concave negative lens $L_{R3}$ and a double-convex positive lens $L_{R4}$, and has a meniscus shape with a concave surface facing the object side as a whole, and a double-convex positive lens $L_{R5}$. The second lens group $G_2$ is constituted by three lenses, i.e., a positive lens $L_{21}$ with a surface of a stronger curvature facing the image side, a double-concave negative lens $L_{22}$, and a negative meniscus lens $L_{23}$ with a concave surface facing the object side.

Figure 9:
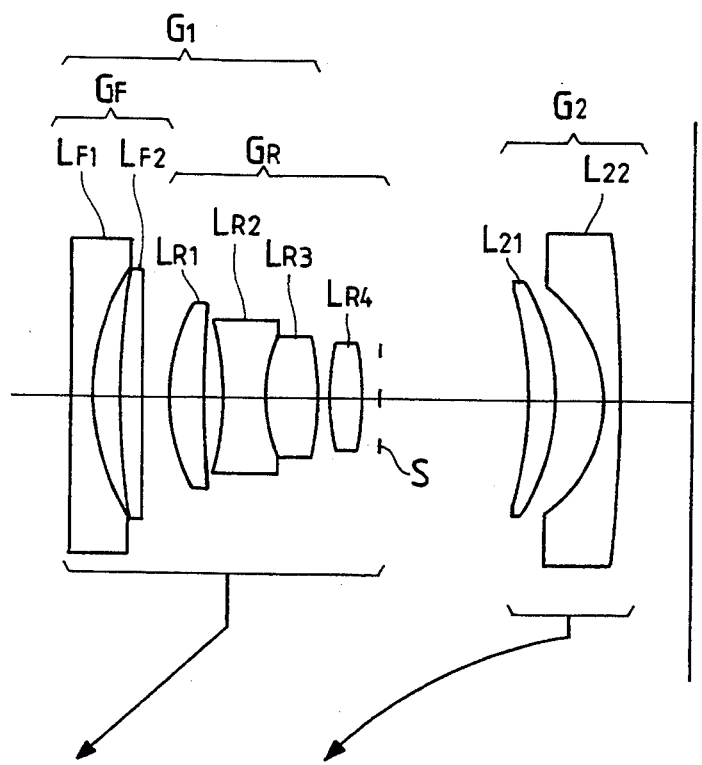

In the ninth embodiment shown in FIG. 9, the rear group $G_R$ in the first lens group $G_1$ and the second lens group $G_2$ have basically the same lens arrangements as those in the first, second, fourth, and seventh embodiments. However, the front group $G_F$ in the first lens group $G_1$ is constituted by two lenses, i.e., a negative lens $L_{F1}$ with a surface of a stronger curvature facing the image side, and a positive lens $L_{F2}$ with a surface of a stronger curvature facing the object side.

In each of the first, second, fourth, seventh, ninth, and 12th embodiments, an aspherical surface is arranged so as to correct aberrations outside the axis with good balance. In the first embodiment, the object-side surface of the negative meniscus lens $L_{22}$ in the second lens group has an aspherical surface. In each of the second, fourth, ninth, and 12th embodiments, the image-side surface of the positive meniscus lens $L_{21}$ in the second group has an aspherical surface. In the seventh embodiment, the object-side surface of the positive meniscus lens $L_{21}$ in the second lens group has an aspherical surface.

Figure 1:
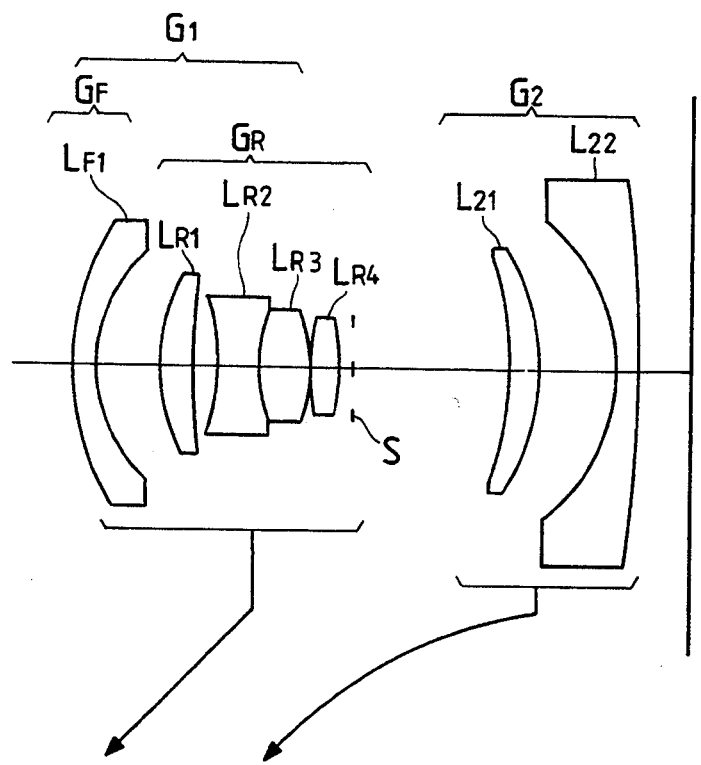
FIGS. 1 to 20 are schematic lens diagrams respectively showing arrangements at the wide-angle end and optical paths according to the first to 20th embodiments of the present invention.
Figure 2:
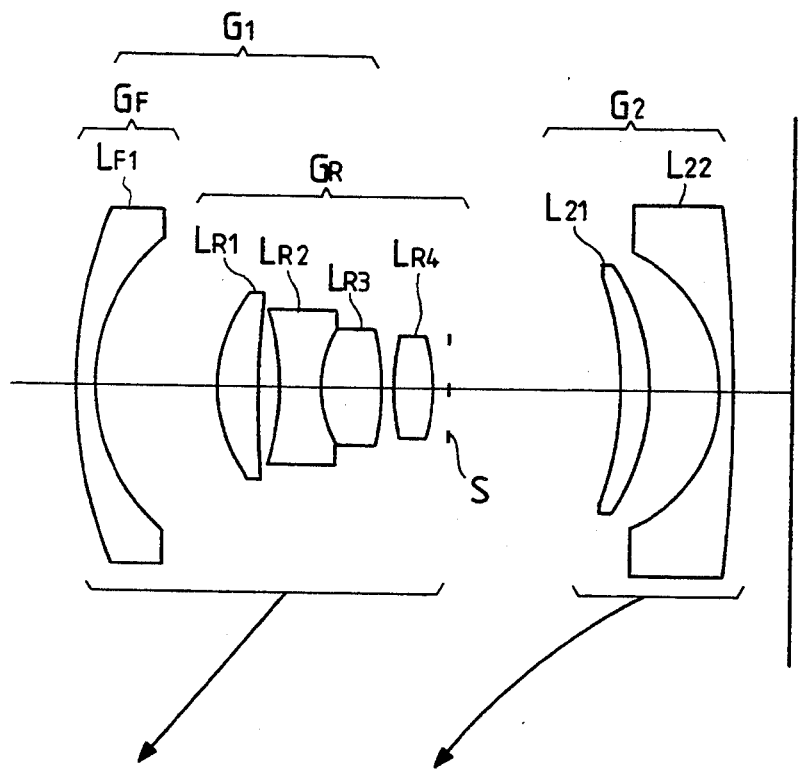

In each of the above embodiments, in order to attain zooming from the wide-angle end toward the telephoto end, as shown in FIG. 1, the two lens groups are moved toward the object side so as to reduce the group interval between the first and second lens groups $G_1$ and $G_2$.

In each embodiment, a stop S is arranged at the image side in the first lens group $G_1$. The stop S is moved integrally with the first lens group $G_1$ in a zooming mode. In each of the first to third embodiments and the fifth to 13th embodiments, the aperture size of the full-aperture stop S is constant during zooming, while in the fourth embodiment, the aperture size of the full-aperture stop S is gradually increased upon zooming from the wide-angle end toward the telephoto end. Thus, the full-aperture f-number at the telephoto end can be decreased while satisfactorily correcting a coma at the wide-angle end.

In a conventional zoom lens of this type consisting of a positive first lens group and a negative second lens group, the negative second lens group is normally used at a positive imaging magnification always larger than 1. For this reason, if the focal length of the entire system is represented by f, the focal length of the positive first lens $G_1$ is represented by $f_1$, and the imaging magnification of the second lens group is represented by $\beta_2$, the relation $f = f_1 \cdot \beta_2$ is satisfied in a geometrical optic sense. Therefore, the focal length $f_1$ of the positive first lens group $G_1$ becomes shorter than the focal length f of the entire system at the wide-angle end. As a result, when the focal length f of the entire system is to be shortened to attain a wider field angle, from the relation $f = f_1 \cdot \beta_2$, the focal length $f_1$ of the first lens group $G_1$ must be further decreased as compared to that in the conventional zoom lens, and the refracting power of the first lens group must be strengthened. Thus, it is more difficult to correct aberrations. Even when this zoom lens is used in a lens-shutter camera whose back focal distance is not so restricted, if the back focal distance is extremely shortened, the diameter of the final lens surface of the second lens group $G_2$ is increased, and it is difficult to attain a compact camera as a whole.

For this reason, a certain back focal distance must be assured even at the wide-angle end. For example, a back focal distance of about 4 mm must be assured for a 35-mm film size.

However, as described in the above U.S. Pat. No. 4,929,069, when a wide field angle having a field angle of 70° to 80° is to be obtained in the conventional zoom lens constituted by the two, positive and negative lens groups, it is difficult to simultaneously assure a required back focal distance at the wide-angle end, and a required group interval between the first and second lens groups $G_1$ and $G_2$ at the telephoto end.

When the focal length $f_1$ of the first lens group $G_1$ is shortened in order to attain a wider field angle, aberrations are worsened accordingly. For this reason, in order to correct these aberrations, the first lens group $G_1$ must have a complicated arrangement using a large number of lenses.

As described above, in the conventional zoom lens constituted by the two, positive and negative lens groups, it is difficult to simply attain a wider field angle while maintaining a compact lens system.

Thus, according to the present invention, the first lens group $G_1$ adopts a new retro-focus type arrangement constituted by the negative front group $G_F$ and the positive rear group $G_R$, so that the rear-side principal point of the first lens group $G_1$ can be located to be separated from a lens surface at the extreme image-side end of the first lens group $G_1$ toward the image side by a large distance. Thus, a required back focal distance at the wide-angle end and a required group interval between the first and second lens groups $G_1$ and $G_2$ at the telephoto end can be simultaneously assured.

Since the first lens group $G_1$ has a negative lens at the extreme object-side end, aberrations outside the axis such as a curvature of field, an astigmatism, a distortion, a chromatic aberration of magnification, and the like can be easily corrected. Thus, the first lens group can be constituted by a smaller number of lenses in principle, and a compact lens system can be attained.

Furthermore, as compared to a case wherein a positive lens is arranged at the extreme object-side end in the first lens group $G_1$, according to the present invention, a more marginal light amount can be assured at the wide-angle end.

In order to reliably attain the above-mentioned effects, the present inventors found the following conditions (1) to (3):

$$0.91 < |f_F/f_W| < 4, \quad f_F < 0 \tag{1}$$

$$0.1 < K/f_W < 0.4 \tag{2}$$

$$0.1 < L/f_W < 0.7 \tag{3}$$

where $f_F$: the focal length of the front group $G_F$ of the first lens group $G_1$ $f_W$: the focal length of the zoom lens at the wide-angle end K: the axial distance from a lens surface at the extreme image-side end of the first lens group $G_1$ to the rear-side principal point of the first lens group $G_1$ when a direction from the lens surface at the extreme image-side end in the first lens group $G_1$ toward the image side is assumed to be a positive direction L: the axial distance from a lens surface at the extreme object-side end of the front group $G_F$ to a lens surface at the extreme object-side end of the rear group $G_R$ in the first lens group $G_1$ The conditions (1) to (3) will be described below.

The condition (1) defines an optimal focal length range of the negative front group $G_F$ in the first lens group $G_1$. When the focal length exceeds the upper limit of the condition (1), the refracting power of the negative front group $G_F$ is weakened, and the effect of the retro-focus type arrangement is lowered in the entire first lens group $G_1$. Thus, since it becomes difficult to locate the rear-side principal point of the first lens group $G_1$ to be separated from the lens surface at the extreme image-side end in the first lens group $G_1$ toward the image side by a large distance, it undesirably becomes difficult to simultaneously assure a required back focal distance at the wide-angle end and a required group interval between the first and second lens groups $G_1$ and $G_2$ at the telephoto end. On the contrary, when the focal length is below the lower limit of the condition (1), the refracting power of the negative front group $G_F$ becomes too strong, and it is difficult to correct a coma at the wide-angle end. Furthermore, the decentration tolerance of the negative front group $G_F$ and the positive rear group $G_R$ becomes more severe.

The condition (2) defines an optimal axial distance from the lens surface at the extreme image-side end in the first lens group $G_1$ to the rear-side principal point of the first lens group $G_1$. When the distance exceeds the upper limit of the condition (2), the first lens group $G_1$ has a retro-focus type arrangement in which the lens surface at the extreme image-side end in this group is extremely separated from the rear-side principal point of the first lens group $G_1$. For this reason, the lens diameter of the rear group $G_R$ in the first lens group $G_1$ is increased, and since a coma and an astigmatism are worsened, the number of lenses constituting the first lens group $G_1$ is increased.

On the contrary, when the distance is below the lower limit of the condition (2), the distance between the lens surface at the extreme image-side end in the first lens group $G_1$ and the rear-side principal point of the first lens group $G_1$ is shortened, and a required back focal distance at the wide-angle end and a required group interval between the first and second lens groups $G_1$ and $G_2$ at the telephoto end cannot be simultaneously assured.

The condition (3) defines a range of an optimal axial distance from the lens surface at the extreme object-side end in the front group $G_F$ in the first lens group $G_1$ to the lens surface at the extreme object-side end in the rear group $G_R$ in the first lens group $G_1$. When the distance exceeds the upper limit of the condition (3), the axial thickness of the first lens group $G_1$ is increased, and the lens diameter of the front group $G_F$ in the first lens group $G_1$ is increased, resulting in a large lens system as a whole. On the contrary, when the distance is below the lower limit of the condition (3), the negative front group $G_F$ and the positive rear group $G_R$ in the first lens group $G_1$ are arranged close to each other. For this reason, when the rear-side principal point of the first lens group $G_1$ is located to be separated from the lens surface at the extreme image-side end in the first lens group $G_1$ toward the image side by a large distance, the refracting power of the front group $G_F$ in the first lens group $G_1$ must be strengthened, thus worsening a coma and an astigmatism. When the coma and the astigmatism are satisfactorily corrected, the number of lenses constituting the first lens group $G_1$ is undesirably increased.

In order to realize the first lens group $G_1$ by a small number of lenses (e.g., five to six lenses), and to satisfactorily correct aberrations outside the axis such as a coma, an astigmatism, and the like, the lower limit value of the condition (3) is preferably set to be 0.16.

In order to correct the aberrations with good balance, the rear group $G_R$ of the first lens group $G_1$ preferably has a positive lens with a convex surface facing the object side, a lens with a concave surface facing the object side, and a positive lens. Furthermore, the lens with the convex surface facing the object side in the rear group $G_R$ is preferably constituted by a negative lens.

In this manner, when the rear group $G_R$ is arranged to have the positive, negative, and positive lenses, the entire first lens group has the power arrangement of negative, positive, negative, and positive, and this arrangement is suitable for correcting the aberrations with good balance. In particular, the positive lens at the extreme object-side end in the rear group $G_R$ has a function of correcting a coma generated in the front group $G_F$, and also has a function of correcting a positive distortion generated in the negative second lens group $G_2$ at the wide-angle end together with the lens with the concave surface facing the object side in the rear group $G_R$.

In each of the 14th to 20th embodiments of the present invention, as shown in FIGS. 14 to 20, a zoom lens is constituted by a first lens group $G_1$ having a positive refracting power, and a second lens group $G_2$ having a negative refracting power. A front group $G_F$ in the first lens group $G_1$ is constituted by a negative meniscus lens $L_{F1}$ with a convex surface facing the object side. A rear group $G_R$ in the first lens group $G_1$ is constituted by a double-convex positive lens $L_{R1}$, a negative combination lens which is a combination lens of a double-concave negative lens $L_{R2}$ and a double-convex positive lens $L_{R3}$, and has a meniscus shape with a concave surface facing the object side as a whole, and a double-convex positive lens $L_{R4}$. The second lens group $G_2$ is constituted by a positive meniscus lens $L_{21}$ with a convex surface facing the image side, and a negative meniscus lens $L_{22}$ with a concave surface facing the object side. The 14th to 20th embodiments have basically the same lens arrangement. In order to correct aberrations outside the axis with good balance, the object-side surface of the negative meniscus lens $L_{22}$ in the second lens group $G_2$ has an aspherical surface.

Upon zooming from the wide-angle end to the telephoto end, as shown in FIGS. 14 to 20, the two lens groups are moved toward the object side so as to reduce the group interval between the first and second lens groups $G_1$ and $G_2$. In each embodiment, a stop S is arranged at the image side in the first lens group $G_1$. The stop S is moved integrally with the first lens group $G_1$ in a zooming mode.

The present invention can attain a compact lens system by adopting the above-mentioned arrangement. A predetermined marginal light amount at the wide-angle end can be assured while suppressing an increase in effective diameter of the negative front group $G_F$.

In the 14th to 20th embodiments of the present invention, in order to reliably attain the above-mentioned effects, the following conditions (4) to (6) were found:

$$0.1 < D_2/f_W < 0.4 \quad (4)$$

$$0.2 < D_3/f_W < 0.4 \quad (5)$$

$$0.75 < |f_F/f_W| < 1.12; f_F < 0 \quad (6)$$

where
- $D_2$: the axial distance from the lens surface at the extreme image-side end in the front group $G_F$ of the first lens group $G_1$ to the lens surface at the extreme object-side end in the rear group $G_R$
- $D_3$: the central thickness of the positive lens at the extreme object-side end in the rear group $G_R$ of the first lens group $G_1$
- $f_W$: the focal length of the zoom lens at the wide-angle end
- $f_F$: the focal length of the front group $G_F$ of the first lens group $G_1$ The condition (4) defines a proper range of the interval between the negative front group $G_F$ and the positive rear group $G_R$ in the first lens group $G_1$. When the interval exceeds the upper limit of the condition (4), this leads to an increase in total length, and the effective diameter at the extreme object-side end in the negative front group $G_F$ is increased to assure a given marginal light amount at the wide-angle end, thus disturbing a compact structure. Furthermore, since the incident height of a principal ray passing through the negative front group $G_F$ to the first lens surface is increased, a chromatic aberration of magnification of the g ray in the negative direction is considerably generated. On the contrary, when the interval is below the lower limit of the condition (4), the lens refracting powers in the first lens group are strengthened due to an extreme compact structure, and in particular, a variation in coma generated in the negative front group $G_F$ is increased.

The condition (5) defines a proper range of the central thickness of the positive lens at the extreme object-side end in the positive rear group $G_R$ in the first lens group $G_1$. When the thickness exceeds the upper limit of the condition (5), if the chromatic aberrations of magnification at the wide-angle end and the telephoto end are suppressed, the chromatic aberration of magnification of the g ray especially in an intermediate focal length state upon zooming remains positive, and cannot be corrected due to a large variation. An increase in central thickness of the lens causes an increase in weight. On the contrary, when the thickness is below the lower limit of the condition (5), the chromatic aberration of magnification is largely bent at the wide-angle end, and has a positive tendency. This worsens a coma associated with colors.

The condition (6) defines an optimal focal length range of the negative front group $G_F$ in the first lens group $G_1$. When the focal length exceeds the upper limit of the condition (6), the refracting power of the negative front group $G_F$ is weakened, and the effect of the retro-focus type arrangement is lowered in the entire first lens group $G_1$. Thus, since it becomes difficult to locate the rear-side principal point of the first lens group $G_1$ to be separated from the lens surface at the extreme image-side end in the first lens group $G_1$ toward the image side by a large distance, it undesirably becomes difficult to simultaneously assure a required back focal distance at the wide-angle end and a required group interval between the first and second lens groups $G_1$ and $G_2$ at the telephoto end. On the contrary, when the focal length is below the lower limit of the condition (6), the refracting power of the negative front group $G_F$ becomes too strong, and it is difficult to correct a coma at the wide-angle end. Furthermore, the decentration tolerance of the negative front group $G_F$ and the positive rear group $G_R$ becomes more severe.

In order to correct the aberrations with good balance, the rear group $G_R$ of the first lens group $G_1$ preferably has a positive lens with a convex surface facing the object side, a lens with a concave surface facing the object side, and a positive lens. Furthermore, the lens with the convex surface facing the object side in the rear group $G_R$ is preferably constituted by a negative lens.

In this manner, when the rear group $G_R$ is arranged to have the positive, negative, and positive lenses, the entire first lens group has the power arrangement of negative, positive, negative, and positive, and this arrangement is suitable for correcting the aberrations with good balance. In particular, the positive lens at the extreme object-side end in the rear group $G_R$ has a function of correcting a coma generated in the front group $G_F$, and also has a function of correcting a positive distortion generated in the negative second lens group $G_2$ at the wide-angle end together with the lens with the concave surface facing the object side in the rear group $G_R$.

Furthermore, in order to attain aberration correction with good balance in the first to 20th embodiments of the present invention, the following conditions (7) and (8) are preferably satisfied.

$$0.6 < f_1/f_W < 0.95 \quad (7)$$

$$0.38 < M/f_W < 0.86 \quad (8)$$

where
- $f_1$: the focal length of the first lens group $G_1$
- M: the axial distance from the lens surface at the extreme object-side end in the rear group $G_R$ to the lens surface at the extreme image-side end in the first lens group $G_1$ The condition (7) defines an optimal focal length of the first lens group $G_1$. When the focal length exceeds the upper limit of the condition (7), an imaging magnification $\beta_2$ of the second lens group $G_2$ at the wide-angle end becomes close to $\times 1$, and since the second lens group $G_2$ noticeably approaches the image surface at the wide-angle end, a sufficient back focal distance at the wide-angle end cannot be assured. On the contrary, when the focal length is below the lower limit of the condition (7), the refracting power of the first lens group $G_1$ becomes excessively large, and it becomes difficult to satisfactorily correct aberrations such as a spherical aberration, a curvature of field, an astigmatism, a coma, and the like.

In order to decrease the number of lenses constituting the first lens group $G_1$ while allowing easy correction of the aberrations, the lower limit value of the condition (7) is preferably set to be 0.7.

The condition (8) defines an optimal distance from the lens surface at the extreme object-side end in the rear group $G_R$ to the lens surface at the extreme image-side end in the first lens group $G_1$. When the distance exceeds the upper limit of the condition (8), the axial thickness of the first lens group $G_1$ is undesirably increased, resulting in a large lens system as a whole. On the contrary, when the rear group $G_R$ of the first lens group $G_1$ is made compact by setting the distance below the lower limit of the condition (8), aberrations outside the axis such as a distortion, a coma, and the like are worsened. Therefore, it becomes difficult to obtain good imaging performance.

The second lens group $G_2$ is preferably arranged to have positive and negative powers or positive, negative, and negative powers in turn from the object side so as to correct the aberrations and to assure a given back focal distance. In particular, when the image-side surface of the positive lens in the second lens group $G_2$ is formed as a convex surface, and the object-side surface of the negative lens is formed as a concave surface, this arrangement is suitable for correcting a coma. At this time, it is more preferable to satisfy the following conditions (9):

$$0.7 < |f_2/f_W| < 1.7, f_2 < 0 \quad (9)$$

where $f_2$: the focal length of the second lens group $G_2$

The conditions (9) define an optical focal length of the second length group $G_2$ so as to simultaneously attain correction of the aberrations and assurance of a required zooming ratio. When the focal length exceeds the upper limit of the conditions (9), since the refracting power of the second lens group $G_2$ is weakened, the moving amount of the second lens group $G_2$ upon zooming is increased. As a result, when a desired zooming ratio is to be obtained, since the first and second lens groups $G_1$ and $G_2$ mechanically interfere with each other, it is difficult to obtain a sufficient zooming ratio. On the contrary, when the focal length is below the lower limit of the conditions (9), the refracting power of the second lens group $G_2$ is increased, and a desired zooming ratio can be obtained by a small moving amount. For this reason, it is advantageous to attain a high zooming ratio. However, it becomes undesirably difficult to correct aberrations such as a distortion, a coma, and the like. Furthermore, the decentration tolerance of the negative front group $G_F$ and the positive rear group $G_R$ becomes more severe, resulting in poor productivity.

When one of the lens surfaces in the second lens group $G_2$ is arranged to have an aspherical surface, it is effective to correct aberrations outside the axis such as a distortion, a coma, a curvature of field, and the like.

Furthermore, in order to satisfactorily correct a chromatic aberration of magnification, the front group $G_F$ of the first lens group $G_1$ preferably has a negative lens satisfying the following condition (10):

$$\nu_d < 50 \quad (10)$$

where $\nu_d$: the Abbe's number of the negative lens in the front group $G_F$ in the first lens group $G_1$ As can be understood from the following specification values, the lens system of each embodiment can have a compact structure constituted by a small number of lenses (about seven to nine lenses).

In each embodiment, good imaging performance can be provided from the wide-angle end to the telephoto end even though a field angle as wide as 73° to 81° can be obtained at the wide-angle end.

From the viewpoint of a wide field angle, the front group $G_F$ in the first lens group $G_1$ can be constituted by a plurality of negative lenses in principle. Furthermore, the front group $G_F$ can also be arranged in principle to include a positive lens having a weak refracting power like in the following arrangements (a) to (d):

(a) when the front group $G_F$ is constituted by a positive lens $L_{F1}$ having a weak refracting power, and one or more negative lenses $L_{F2}$, $L_{F3}$, ..., $L_{FK}$ in turn from the object side;

(b) when the front group $G_F$ is constituted by one or more negative lenses $L_{F1}$, $L_{F2}$, ..., $L_{FK-1}$, and a positive lens $L_{FK}$ having a weak refracting power in turn from the object side;

(c) when the front group $G_F$ is constituted by one or more negative lenses $L_{F1}$, $L_{F2}$, ..., $L_{FK-2}$, a positive lens $L_{FK-1}$ having a weak refracting power, and one or more negative lenses $L_{FK}$, ..., $L_{Fn}$ in turn from the object side; and (d) when the front group $G_F$ is constituted by a positive lens $L_{F1}$ having a weak refracting power, one or more negative lenses $L_{F2}$, $L_{F3}$, ..., $L_{FK-1}$, and a positive lens $L_{FK}$ having a weak refracting power.

However, in order to realize a compact, lightweight, and low-cost lens system, the front group $G_F$ in the first lens group $G_1$ is preferably constituted by one or two lenses, and more preferably, like in each of the embodiments described above, the front group $G_F$ in the first lens group is constituted by a single negative lens, two negative lenses, or a single negative lens and a single positive lens.

Tables 1 to 20 below summarize specification values and numerical values corresponding to conditions in each of the embodiments of the present invention.

Note that numerals at the left end in each of the following tables represent the order from the object side, r is the radius of curvature of a lens surface, d is the lens surface interval, v is the Abbe's number, n is the refractive index of the d ray ($\lambda = 587.6$ nm), f is the focal length of the entire system, $2\omega$ is the field angle, and $F_{NO}$ is the f-number. An aspherical shape is expressed by:

$$X(h) = (h^2/r)/[1 + (1 - kh^2/r^2)^{\frac{1}{2}}] + c2h^2 + c4h^4 + c6h^6 + c8h^8 + c10h^{10}$$

where X(h) is the distance along the optical axis direction from a tangent plane of the vertex of each aspherical surface at a height h in the vertical direction from the optical axis, r is the reference paraxial radius of curvature, k is a cone constant, and cn is an nth-order aspherical surface coefficient. In addition, E-n at the right end in the cone constant k and the nth-order aspherical surface coefficient cn represents $10^{-n}$.

TABLE 1

(First Embodiment)
$2\omega = 80.9°$ to $65.7°$, $F_{NO} = 4.10$ to $5.65$

|   | r | d | ν | n |
|---|---|---|---|---|
| 1 | 22.650 | 1.40 | 57.0 | 1.62280 |
| 2 | 11.723 | 5.00 | | |
| 3 | 13.335 | 2.50 | 40.9 | 1.79631 |
| 4 | 46.542 | 2.00 | | |
| 5 | −15.567 | 3.30 | 40.9 | 1.79631 |
| 6 | 12.959 | 4.00 | 69.9 | 1.51860 |
| 7 | −15.241 | 0.10 | | |
| 8 | 26.064 | 2.00 | 69.9 | 1.51860 |
| 9 | −18.856 | (d9) | | |
| 10 | −28.030 | 2.30 | 45.4 | 1.79668 |
| 11 | −21.549 | 6.60 | | |
| 12 | −15.352 | 1.30 | 55.6 | 1.69680 |
| 13 | −123.872 | (Bf) | | |

(Variable Interval Upon Zooming)

| f | 24.7000 | 28.0000 | 34.0000 |
|---|---|---|---|
| d9 | 12.9868 | 9.3127 | 4.4598 |
| Bf | 4.3908 | 9.6408 | 19.1862 |

12th Surface (Aspherical Surface)

Cone Constant: k = 1.00
Aspherical Surface Coefficients
$c_2 = 0.0$, $c_4 = -0.2810E-04$, $c_6 = -0.2017E-07$,
$c_8 = -0.1980E-09$, $c_{10} = -0.1268E-11$ (Numerical Values Corresponding to Conditions)

$|f_F/f_W| = 1.662$, $K/f_W = 0.141$, $L/f_W = 0.259$,
$f_1/f_W = 0.891$, $M/f_W = 0.563$, $|f_2/f_W| = 1.417$,
$\nu_d = 57.0$

TABLE 2

(Second Embodiment)
$2\omega = 80.8°$ to $48.5°$, $F_{NO} = 4.01$ to $7.87$

|   | r | d | ν | n |
|---|---|---|---|---|
| 1 | 36.582 | 1.40 | 69.9 | 1.51860 |
| 2 | 14.913 | 10.00 | | |
| 3 | 12.918 | 3.00 | 47.1 | 1.67003 |
| 4 | 67.006 | 1.50 | | |
| 5 | −21.100 | 3.30 | 44.7 | 1.80218 |
| 6 | 9.053 | 4.70 | 69.9 | 1.51860 |
| 7 | −22.449 | 1.00 | | |
| 8 | 28.564 | 3.00 | 69.9 | 1.51860 |
| 9 | −15.476 | (d9) | | |
| 10 | −25.423 | 2.30 | 45.4 | 1.79668 |
| 11 | −18.559 | 5.40 | | |
| 12 | −12.104 | 1.30 | 49.4 | 1.77279 |
| 13 | −91.224 | (Bf) | | |

(Variable Interval Upon Zooming)

| f | 24.7000 | 35.0000 | 48.5003 |
|---|---|---|---|
| d9 | 14.7790 | 8.5239 | 4.3486 |
| Bf | 4.3098 | 16.5718 | 32.6435 |

11th Surface (Aepherical Surface)

Cone Constant: k = 1.00
Aspherical Surface Coefficients
$c_2 = 0.0$, $c_4 = -0.1125E-05$, $c_6 = -0.2433E-06$,
$c_8 = 0.1205E-08$, $c_{10} = -0.7595E-11$ (Numerical Values Corresponding to Conditions)

$|f_F/f_W| = 2.010$, $K/f_W = 0.194$, $L/f_W = 0.462$,
$f_1/f_W = 0.850$, $M/f_W = 0.668$, $|f_2/f_W| = 1.012$,
$\nu_d = 69.9$

TABLE 3

(Third Embodiment)
$2\omega = 73.5°$ to $53.6°$, $F_{NO} = 3.60$ to $5.46$

|   | r | d | ν | n |
|---|---|---|---|---|
| 1 | 25.764 | 1.40 | 54.0 | 1.61720 |
| 2 | 12.978 | 7.50 | | |
| 3 | 14.053 | 2.90 | 49.4 | 1.77279 |
| 4 | 60.943 | 2.00 | | |
| 5 | −17.855 | 2.80 | 44.7 | 1.80218 |
| 6 | 12.454 | 4.70 | 69.9 | 1.51860 |
| 7 | −19.794 | 0.20 | | |
| 8 | 54.636 | 2.20 | 60.0 | 1.64000 |
| 9 | −18.737 | (d9) | | |
| 10 | −240.704 | 3.80 | 40.9 | 1.79631 |
| 11 | −24.842 | 2.00 | | |
| 12 | −19.268 | 1.00 | 39.6 | 1.80454 |
| 13 | 114.664 | 6.10 | | |
| 14 | −16.000 | 1.20 | 60.1 | 1.62041 |
| 15 | −22.304 | (Bf) | | |

(Variable Interval Upon Zooming)

| f | 28.8000 | 35.0001 | 43.7000 |
|---|---|---|---|
| d9 | 13.3643 | 8.1607 | 3.3486 |
| Bf | 4.3696 | 13.8675 | 27.1950 |

(Numerical Values Corresponding to Conditions)

$|f_F/f_W| = 1.535$, $K/f_W = 0.158$, $L/f_W = 0.309$,
$f_1/f_W = 0.816$, $M/f_W = 0.514$, $|f_2/f_W| = 1.250$,
$\nu_d = 54.0$

TABLE 4

(Fourth Embodiment)
$2\omega = 72.3°$ to $44.5°$, $F_{NO} = 4.50$ to $5.62$

|   | r | d | ν | n |
|---|---|---|---|---|
| 1 | 24.670 | 1.40 | 57.0 | 1.62280 |
| 2 | 13.333 | 7.50 | | |
| 3 | 15.860 | 2.50 | 45.0 | 1.74400 |
| 4 | 82.002 | 2.00 | | |
| 5 | −17.913 | 3.30 | 44.7 | 1.80218 |
| 6 | 13.483 | 4.70 | 70.0 | 1.51860 |
| 7 | −16.789 | 1.00 | | |
| 8 | 29.915 | 3.00 | 70.0 | 1.51860 |
| 9 | −19.657 | (d9) | | |
| 10 | −22.629 | 2.30 | 45.4 | 1.79668 |
| 11 | −16.126 | 4.40 | | |
| 12 | −12.072 | 1.30 | 47.5 | 1.78797 |
| 13 | −64.687 | (Bf) | | |

(Variable Interval upon Zooming)

| f | 28.8068 | 37.9904 | 53.4859 |
|---|---|---|---|
| d9 | 14.5448 | 9.1528 | 4.2528 |
| Bf | 8.0716 | 19.8680 | 39.7720 |

11th Surface (Aspherical Surface)

Cone Constant: k = 1.00
Aspherical Surface Coefficients
$c_2 = 0.0$, $c_4 = -0.3536E-05$, $c_6 = -0.2223E-07$,
$c_8 = -0.1381E-09$, $c_{10} = -0.1133E-10$ (Numerical Values Corresponding to Conditions)

$|f_F/f_W| = 1.698$, $K/f_W = 0.163$, $L/f_W = 0.309$,
$f_1/f_W = 0.776$, $M/f_W = 0.573$, $|f_2/f_W| = 0.997$,
$\nu_d = 57.0$

TABLE 5

(Fifth Embodiment)
$2\omega = 73.1°$ to $44.7°$, $F_{NO} = 3.60$ to $6.68$

|   | r | d | ν | n |
|---|---|---|---|---|
| 1 | 197.859 | 2.00 | 69.9 | 1.51860 |
| 2 | 19.388 | 7.00 | | |
| 3 | 24.521 | 3.00 | 45.9 | 1.54814 |
| 4 | 136.978 | 0.30 | | |
| 5 | 13.789 | 2.70 | 59.0 | 1.51823 |
| 6 | 31.717 | 2.70 | | |
| 7 | −15.651 | 2.50 | 37.3 | 1.83400 |
| 8 | 17.163 | 4.30 | 60.3 | 1.51835 |
| 9 | −12.474 | 0.20 | | |
| 10 | 24.890 | 2.00 | 54.0 | 1.61720 |
| 11 | −47.535 | (d11) | | |
| 12 | −18.716 | 1.90 | 25.5 | 1.80458 |
| 13 | −15.044 | 5.00 | | |

TABLE 5-continued (Fifth Embodiment)
$2\omega = 73.1°$ to $44.7°$, $F_{NO} = 3.60$ to $6.68$

| | | | | |
|---|---|---|---|---|
| 14 | −12.495 | 1.30 | 40.9 | 1.79631 |
| 15 | −54.769 | (Bf) | | |

(Variable Interval Upon Zooming)

| f | 28.8066 | 37.9897 | 53.4836 |
|---|---|---|---|
| d11 | 13.7672 | 8.3752 | 3.4752 |
| Bf | 7.7971 | 19.5932 | 39.4958 |

(Numerical Values Corresponding to Conditions)

$|f_F/f_W| = 1.444$, $K/f_W = 0.138$, $L/f_W = 0.312$,
$f_1/f_W = 0.776$, $M/f_W = 0.614$, $|f_2/f_W| = 0.997$,
$\nu_d = 69.9$

TABLE 6

(Sixth Embodiment)
$2\omega = 72.6°$ to $4.5°$, $F_{NO} = 3.60$ to $6.69$

| | r | d | ν | n |
|---|---|---|---|---|
| 1 | 14.054 | 1.40 | 55.6 | 1.69680 |
| 2 | 10.361 | 6.00 | | |
| 3 | −329.940 | 1.40 | 60.1 | 1.62041 |
| 4 | 53.650 | 1.00 | | |
| 5 | 14.357 | 3.30 | 47.1 | 1.67003 |
| 6 | −192.090 | 1.70 | | |
| 7 | −15.831 | 3.50 | 37.3 | 1.83400 |
| 8 | 12.497 | 4.00 | 60.3 | 1.51835 |
| 9 | −19.372 | 0.20 | | |
| 10 | 39.206 | 2.30 | 50.8 | 1.65844 |
| 11 | −17.082 | (d11) | | |
| 12 | −25.204 | 2.30 | 25.5 | 1.80458 |
| 13 | −18.690 | 5.10 | | |
| 14 | −14.000 | 1.30 | 37.3 | 1.83400 |
| 15 | −80.772 | (Bf) | | |

(Variable Interval Upon Zooming)

| f | 28.8067 | 37.9898 | 53.4840 |
|---|---|---|---|
| d11 | 13.8391 | 8.4471 | 3.5471 |
| Bf | 8.0709 | 19.8670 | 39.7699 |

(Numerical Values Corresponding to Conditions)

$|f_F/f_W| = 1.189$, $K/f_W = 0.162$, $L/f_W = 0.340$,
$f_1/f_W = 0.776$, $M/f_W = 0.521$, $|f_2/f_W| = 0.997$,
$\nu_d = 55.6$ ($L_{F1}$), $\nu_d = 60.1$ ($L_{F2}$)

TABLE 7

(Seventh Embodiment)
$2\omega = 72.6°$ to $35.3°$, $F_{NO} = 3.60$ to $8.49$

| | r | d | ν | n |
|---|---|---|---|---|
| 1 | 25.849 | 1.40 | 57.0 | 1.62280 |
| 2 | 13.482 | 8.20 | | |
| 3 | 14.827 | 3.20 | 47.1 | 1.67003 |
| 4 | 232.513 | 2.00 | | |
| 5 | −17.188 | 3.30 | 44.7 | 1.80218 |
| 6 | 13.072 | 4.70 | 69.9 | 1.51860 |
| 7 | −16.673 | 0.15 | | |
| 8 | 44.207 | 2.70 | 64.1 | 1.51680 |
| 9 | −17.869 | (d9) | | |
| 10 | −38.731 | 3.10 | 31.6 | 1.75692 |
| 11 | −24.465 | 5.00 | | |
| 12 | −11.987 | 1.30 | 43.3 | 1.84042 |
| 13 | −49.324 | (Bf) | | |

(Variable Interval Upon Zooming)

| f | 28.8000 | 45.0000 | 67.9005 |
|---|---|---|---|
| d9 | 16.2789 | 8.6414 | 4.0621 |
| Bf | 5.5645 | 23.4879 | 48.8245 |

10th Surface (Aspherical Surface)

Cone Constant: $k = 1.00$
Aspherical Surface Coefficients $c2 = 0.0$, $c4 = 0.2427E-04$, $c6 = 0.2213E-06$,
$c8 = 0.1675E-09$, $c10 = 0.4614E-11$ (Numerical Values Corresponding to Conditions)

TABLE 7-continued (Seventh Embodiment)
$2\omega = 72.6°$ to $35.3°$, $F_{NO} = 3.60$ to $8.49$ $|f_F/f_W| = 1.642$, $K/f_W = 0.162$, $L/f_W = 0.333$,
$f_1/f_W = 0.816$, $M/f_W = 0.557$, $|f_2/f_W| = 0.902$,
$\nu_d = 57.0$

TABLE 8

(Eighth Embodiment)
$2\omega = 81.7°$ to $50.4°$, $F_{NO} = 4.00$ to $7.61$

| | r | d | ν | n |
|---|---|---|---|---|
| 1 | 48.662 | 1.40 | 70.1 | 1.51860 |
| 2 | 9.559 | 5.94 | | |
| 3 | 100.989 | 2.00 | 60.8 | 1.56384 |
| 4 | 1184.828 | 0.45 | | |
| 5 | 14.417 | 3.00 | 40.4 | 1.60717 |
| 6 | −63.718 | 1.50 | | |
| 7 | −20.049 | 3 30 | 40.9 | 1.79631 |
| 8 | 10.814 | 4.58 | 70.1 | 1.51860 |
| 9 | −18.051 | 0.20 | | |
| 10 | 46.580 | 2.81 | 70.1 | 1.51860 |
| 11 | −15.354 | (d11) | | |
| 12 | −139.781 | 4.00 | 47.1 | 1.67003 |
| 13 | −16.243 | 0.50 | | |
| 14 | −18.624 | 1.30 | 52.3 | 1.74810 |
| 15 | 174.141 | 6.00 | | |
| 16 | −11.049 | 1.20 | 49.4 | 1.77279 |
| 15 | −20.995 | (Bf) | | |

(Variable Interval Upon Zooming)

| f | 24.7000 | 35.0000 | 47.0000 |
|---|---|---|---|
| d11 | 12.4919 | 6.8478 | 3.3921 |
| Bf | 5.6032 | 19.4303 | 35.5397 |

(Numerical Values Corresponding to Conditions)

$|f_F/f_W| = 0.940$, $K/f_W = 0.309$, $L/f_W = 0.297$,
$f_1/f_W = 0.761$, $M/f_W = 0.722$, $|f_2/f_W| = 1.021$,
$\nu_d = 70.1$

TABLE 9

(Ninth Embodiment)
$2\omega = 81.0°$ to $50.5°$, $F_{NO} = 4.01$ to $7.63$

| | r | d | ν | n |
|---|---|---|---|---|
| 1 | −757.521 | 1.40 | 70.1 | 1.51860 |
| 2 | 14.921 | 2.63 | | |
| 3 | 45.833 | 2.00 | 56.0 | 1.56883 |
| 4 | −1758.247 | 2.00 | | |
| 5 | 12.814 | 3.00 | 47.1 | 1.62374 |
| 6 | 92.013 | 1.50 | | |
| 7 | −20.683 | 3.30 | 44.7 | 1.80218 |
| 8 | 8.793 | 4.58 | 70.1 | 1.51860 |
| 9 | −21.405 | 1.00 | | |
| 10 | 23.137 | 2.81 | 70.1 | 1.51860 |
| 11 | −15.554 | (d11) | | |
| 12 | −27.213 | 2.30 | 40.9 | 1.79631 |
| 13 | −16.225 | 3.83 | | |
| 14 | −10.450 | 1.30 | 49.4 | 1.77279 |
| 15 | −113.948 | (Bf) | | |

(Variable Interval Upon Zooming)

| f | 24.7000 | 35.0000 | 47.0000 |
|---|---|---|---|
| d11 | 13.5916 | 7.9956 | 4.5693 |
| Bf | 6.0474 | 18.3524 | 32.6884 |

13th Surface (Aspherical Surface)

Cone Constant: $k = 1.00$
Aspherical Surface Coefficients $c2 = 0.0$, $c4 = -0.1305E-04$, $c6 = -0.2596E-06$,
$c8 = 0.5319E-08$, $c10 = -0.5783E-10$ (Numerical Values Corresponding to Conditions)

$|f_F/f_W| = 1.881$, $K/f_W = 0.184$, $L/f_W = 0.325$,
$f_1/f_W = 0.803$, $M/f_W = 0.655$, $|f_2/f_W| = 0.959$,
$\nu_d = 70.1$

TABLE 10

(10th Embodiment)
$2\omega = 81.4°$ to $50.1°$, $F_{NO} = 4.00$ to $7.61$

|    | r        | d     | ν    | n       |
|----|----------|-------|------|---------|
| 1  | 20.276   | 1.40  | 70.1 | 1.51860 |
| 2  | 8.605    | 8.30  |      |         |
| 3  | 17.141   | 3.00  | 40.4 | 1.60717 |
| 4  | −50.434  | 1.50  |      |         |
| 5  | −18.928  | 3.30  | 40.9 | 1.79631 |
| 6  | 12.348   | 4.50  | 70.1 | 1.51860 |
| 7  | −15.644  | 0.20  |      |         |
| 8  | 62.738   | 2.80  | 70.1 | 1.51860 |
| 9  | −15.275  | (d9)  |      |         |
| 10 | −242.922 | 3.00  | 47.1 | 1.67003 |
| 11 | −17.147  | 0.50  |      |         |
| 12 | −19.696  | 1.30  | 52.3 | 1.74810 |
| 13 | 119.721  | 6.00  |      |         |
| 14 | −11.661  | 1.20  | 55.6 | 1.69680 |
| 15 | −25.029  | (Bf)  |      |         |

(Variable Interval Upon Zooming)

| f  | 24.7000 | 34.9999 | 47.0000 |
|----|---------|---------|---------|
| d9 | 12.7074 | 6.8392  | 3.2462  |
| Bf | 5.6463  | 19.6368 | 35.9368 |

(Numerical Values Corresponding to Conditions)

$|f_F/f_W| = 1.217$, $K/f_W = 0.295$, $L/f_W = 0.393$,
$f_1/f_W = 0.771$, $M/f_W = 0.619$, $|f_2/f_W| = 1.047$,
$\nu_d = 70.1$

TABLE 11

(11th Embodiment)
$2\omega = 81.0°$ to $49.9°$, $F_{NO} = 4.01$ to $7.63$

|    | r        | d     | ν    | n       |
|----|----------|-------|------|---------|
| 1  | 16.304   | 1.40  | 55.6 | 1.69680 |
| 2  | 8.307    | 7.78  |      |         |
| 3  | 18.085   | 3.00  | 38.1 | 1.60342 |
| 4  | −38.197  | 1.50  |      |         |
| 5  | −17.064  | 4.21  | 40.9 | 1.79631 |
| 6  | 14.089   | 3.50  | 70.1 | 1.51860 |
| 7  | −14.116  | 0.20  |      |         |
| 8  | 73.360   | 2.50  | 70.1 | 1.51860 |
| 9  | −15.127  | (d9)  |      |         |
| 10 | −187.630 | 4.00  | 48.1 | 1.71700 |
| 11 | −17.504  | 0.50  |      |         |
| 12 | −19.518  | 1.30  | 52.3 | 1.74810 |
| 13 | 119.152  | 6.00  |      |         |
| 14 | −12.112  | 1.20  | 54.0 | 1.71300 |
| 15 | −27.416  | (Bf)  |      |         |

(Variable Interval Upon Zooming)

| f  | 24.7000 | 35.0000 | 47.0000 |
|----|---------|---------|---------|
| d9 | 12.7137 | 6.9873  | 3.4812  |
| Bf | 5.8536  | 19.7293 | 35.8952 |

(Numerical Values Corresponding to Conditions)

$|f_F/f_W| = 1.060$, $K/f_W = 0.326$, $L/f_W = 0.372$,
$f_1/f_W = 0.765$, $M/f_W = 0.604$, $|f_2/f_W| = 1.030$,
$\nu_d = 55.6$

TABLE 12

(12th Embodiment)
$2\omega = 80.9°$ to $50.1°$, $F_{NO} = 4.00$ to $7.61$

|    | r        | d     | ν    | n       |
|----|----------|-------|------|---------|
| 1  | 646.314  | 1.40  | 70.1 | 1.51860 |
| 2  | 14.895   | 5.94  |      |         |
| 3  | 56.368   | 2.00  | 60.8 | 1.56384 |
| 4  | −394.173 | 0.45  |      |         |
| 5  | 12.463   | 3.00  | 40.4 | 1.60717 |
| 6  | 143.065  | 1.50  |      |         |
| 7  | −20.295  | 3.30  | 40.9 | 1.79631 |
| 8  | 9.059    | 4.58  | 70.1 | 1.51860 |
| 9  | −22.896  | 0.20  |      |         |
| 10 | 28.452   | 2.81  | 70.1 | 1.51860 |
| 11 | −15.372  | (d11) |      |         |
| 12 | −28.348  | 2.30  | 33.9 | 1.80384 |

TABLE 12-continued (12th Embodiment)
$2\omega = 80.9°$ to $50.1°$, $F_{NO} = 4.00$ to $7.61$

| 13 | −17.740  | 4.17  |      |         |
| 14 | −10.896  | 1.30  | 49.4 | 1.77279 |
| 15 | −102.351 | (Bf)  |      |         |

(Variable Interval Upon Zooming)

| f   | 24.7000 | 35.0000 | 47.0000 |
|-----|---------|---------|---------|
| d11 | 13.6683 | 8.0201  | 4.5619  |
| Bf  | 5.9493  | 18.3353 | 32.7656 |

13th Surface (Aspherical Surface)
Cone Constant: $k = 1.00$
Aspherical Surface Coefficients
$c2 = 0.0$, $c4 = -0.1752E-04$, $c6 = -0.1528E-06$,
$c8 = 0.1863E-08$, $c10 = -0.2984E-10$
(Numerical Values Corresponding to Conditions)
$|f_F/f_W| = 1.191$, $K/f_W = 0.195$, $L/f_2 = 0.297$,
$f_1/f_W = 0.804$, $M/f_W 0.722$, $|f_2/f_W| = 0.967$,
$\nu_d = 70.1$

TABLE 13

(13th Embodiment)
$2\omega = 80.9°$ to $50.1°$, $F_{NO} = 4.00$ to $7.61$

|    | r        | d     | ν    | n       |
|----|----------|-------|------|---------|
| 1  | 35.172   | 1.40  | 70.1 | 1.51860 |
| 2  | 11.972   | 10.00 |      |         |
| 3  | 101.444  | 2.00  | 60.8 | 1.56384 |
| 4  | 125.222  | 0.45  |      |         |
| 5  | 15.510   | 3.00  | 40.4 | 1.60717 |
| 6  | −121.711 | 1.50  |      |         |
| 7  | −17.264  | 3.30  | 40.9 | 1.79631 |
| 8  | 11.630   | 4.58  | 70.1 | 1.51860 |
| 9  | −17.516  | 0.20  |      |         |
| 10 | 36.151   | 2.81  | 64.1 | 1.51860 |
| 11 | −16.330  | (d11) |      |         |
| 12 | −48.833  | 3.00  | 45.9 | 1.54814 |
| 13 | −21.554  | 0.50  |      |         |
| 14 | −133.247 | 0.80  | 54.0 | 1.71300 |
| 15 | 92.156   | 6.30  |      |         |
| 16 | −12.127  | 1.00  | 54.0 | 1.71300 |
| 17 | −42.017  | (Bf)  |      |         |

(Variable Interval Upon Zooming)

| f   | 24.6999 | 34.9998 | 46.9997 |
|-----|---------|---------|---------|
| d11 | 12.8000 | 7.0459  | 3.5228  |
| Bf  | 6.3472  | 19.8374 | 35.5542 |

(Numerical Values Corresponding to Conditions)

$|f_F/f_W| = 1.447$, $K/f_W = 0.324$, $L/f_2 = 0.462$,
$f_1/f_W = 0.777$, $M/f_W 0.722$, $|f_2/f_W| = 1.018$,
$\nu_d = 70.1$

TABLE 14

(14th Embodiment)
$2\omega = 81.3°$ to $49.9°$, $F_{NO} = 4.08$ to $7.82$

|    | r        | d     | ν    | n       |
|----|----------|-------|------|---------|
| 1  | 21.435   | 1.40  | 55.6 | 1.69680 |
| 2  | 8.392    | 3.30  |      |         |
| 3  | 11.239   | 5.40  | 41.4 | 1.57501 |
| 4  | −29.971  | .70   |      |         |
| 5  | −14.229  | 3.50  | 40.9 | 1.79631 |
| 6  | 11.077   | 3.80  | 69.9 | 1.51860 |
| 7  | −14.555  | .20   |      |         |
| 8  | 47.678   | 2.80  | 69.9 | 1.51860 |
| 9  | −13.366  | (d9)  |      |         |
| 10 | −27.913  | 2.60  | 49.4 | 1.74240 |
| 11 | −19.186  | 4.60  |      |         |
| 12 | −10.455  | 1.30  | 60.0 | 1.64000 |
| 13 | −95.825  | (Bf)  |      |         |

(Variable Interval Upon Zooming)

| f   | 24.7000 | 35.0000 | 47.0000 |
|-----|---------|---------|---------|
| d9  | 13.2523 | 7.3493  | 3.7351  |
| d13 | 6.3891  | 19.7808 | 35.3828 |

10th Surface (Aspherical Surface)
Cone Constant: $k = .1000 \times 10$
Aspherical Surface Coefficients
$c2 = .0000$, $c4 = -.3439 \times 10^{-4}$, $c6 = -.1040 \times 10^{-6}$,
$c8 = .1110 \times 10^{-8}$, $c10 = -.1862 \times 10^{-10}$

TABLE 14-continued (14th Embodiment)
$2\omega = 81.3°$ to $49.9°$, $F_{NO} = 4.08$ to $7.82$ (Numerical Values Corresponding to Conditions)
$D_2/f_W = 0.133$, $D_3/f_W = 0.219$, $|f_F/f_W| = 0.838$,
$f_1/f_W = 0.790$, $M/f_W 0.664$, $|f_2/f_W| = 1.028$,
$\nu_d = 55.60$

TABLE 15

(15th Embodiment)
$2\omega = 81.2°$ to $50.1°$, $F_{NO} = 4.08$ to $7.83$

| | r | d | ν | n |
|---|---|---|---|---|
| 1 | 23.130 | 1.40 | 55.6 | 1.69680 |
| 2 | 8.440 | 3.70 | | |
| 3 | 11.773 | 6.50 | 40.7 | 1.58144 |
| 4 | −32.846 | 1.00 | | |
| 5 | −14.205 | 2.50 | 40.9 | 1.79631 |
| 6 | 10.542 | 3.90 | 69.9 | 1.51860 |
| 7 | −14.401 | .20 | | |
| 8 | 41.295 | 2.40 | 69.9 | 1.51860 |
| 9 | −12.855 | (d9) | | |
| 10 | −22.495 | 2.60 | 49.4 | 1.74240 |
| 11 | −16.826 | 4.70 | | |
| 12 | −10.290 | 1.30 | 60.0 | 1.64000 |
| 13 | −68.640 | (Bf) | | |

(Variable Interval Upon Zooming)

| f | 24.7000 | 35.0000 | 47.0000 |
|---|---|---|---|
| d9 | 13.2618 | 7.3674 | 3.7585 |
| d13 | 7.0341 | 21.0606 | 37.4022 |

10th Surface (Aspherical Surface)
Cone Constant: $k = .1000 \times 10$
Aspherical Surface Coefficients
$c2 = .0000$, $c4 = -.3139 \times 10^{-4}$, $c6 = -.2485 \times 10^{-7}$,
$c8 = .3372 \times 10^{-8}$, $c10 = -.8716 \times 10^{-11}$
(Numerical Values Corresponding to Conditions)
$D_2/f_W = 0.150$, $D_3/f_W = 0.263$, $|f_F/f_W| = 0.804$,
$f_1/f_W = 0.772$, $M/f_W 0.668$, $|f_2/f_W| = 1.051$,
$\nu_d = 55.60$

TABLE 16

(16th Embodiment)
$2\omega = 81.3°$ to $49.9°$, $F_{NO} = 4.10$ to $7.87$

| | r | d | ν | n |
|---|---|---|---|---|
| 1 | 23.277 | 1.40 | 55.6 | 1.69680 |
| 2 | 8.166 | 3.30 | | |
| 3 | 11.365 | 5.60 | 40.7 | 1.58144 |
| 4 | −25.499 | .70 | | |
| 5 | −13.771 | 3.60 | 40.9 | 1.79631 |
| 6 | 10.503 | 3.50 | 69.9 | 1.51860 |
| 7 | −15.096 | .20 | | |
| 8 | 51.118 | 2.80 | 69.9 | 1.51860 |
| 9 | −12.204 | (d9) | | |
| 10 | −29.253 | 2.60 | 49.2 | 1.74330 |
| 11 | −19.555 | 4.80 | | |
| 12 | −10.668 | 1.30 | 60.0 | 1.64000 |
| 13 | −122.254 | (Bf) | | |

(Variable Interval Upon Zooming)

| f | 24.7000 | 35.0000 | 47.0000 |
|---|---|---|---|
| d9 | 13.3040 | 7.3914 | 3.7713 |
| d13 | 7.0230 | 20.7253 | 36.6891 |

10th Surface (Aspherical Surface)
Cone Constant: $k = .1000 \times 10$
Aspherical Surface Coefficients
$c2 = .0000$, $c4 = -.2758 \times 10^{-4}$, $c6 = -.1565 \times 10^{-6}$,
$c8 = .1325 \times 10^{-8}$, $c10 = -.6892 \times 10^{-11}$
(Numerical Values Corresponding to Conditions)
$D_2/f_W = 0.133$, $D_3/f_W = 0.227$, $|f_F/f_W| = 0.760$,
$f_1/f_W = 0.782$, $M/f_W 0.664$, $|f_2/f_W| = 1.040$,
$\nu_d = 55.60$

TABLE 17

(17th Embodiment)
$2\omega = 81.2°$ to $49.8°$, $F_{NO} = 4.08$ to $7.82$

| | r | d | ν | n |
|---|---|---|---|---|
| 1 | 22.065 | 1.40 | 55.6 | 1.69680 |
| 2 | 8.464 | 3.30 | | |
| 3 | 11.325 | 5.74 | 41.4 | 1.57501 |
| 4 | −30.545 | .70 | | |
| 5 | −14.108 | 3.61 | 40.9 | 1.79631 |
| 6 | 11.555 | 3.50 | 69.9 | 1.51860 |
| 7 | −14.313 | .20 | | |
| 8 | 46.612 | 2.80 | 69.9 | 1.51860 |
| 9 | −13.494 | (d9) | | |
| 10 | −26.529 | 2.60 | 45.0 | 1.74400 |
| 11 | −19.655 | 5.07 | | |
| 12 | −10.609 | 1.30 | 60.0 | 1.64000 |
| 13 | −78.447 | (Bf) | | |

(Variable Interval Upon Zooming)

| f | 24.7000 | 35.0000 | 47.0000 |
|---|---|---|---|
| d9 | 13.2718 | 7.3725 | 3.7606 |
| d13 | 5.9704 | 19.2136 | 34.6425 |

10th Surface (Aspherical Surface)
Cone Constant: $k = .1000 \times 10$
Aspherical Surface Coefficients
$c2 = .0000$, $c4 = -.3207 \times 10^{-4}$, $c6 = -.1167 \times 10^{-6}$,
$c8 = .1127 \times 10^{-8}$, $c10 = -.1492 \times 10^{-10}$
(Numerical Values Corresponding to Conditions)
$D_2/f_W = 0.133$, $D_3/f_W = 0.232$, $|f_F/f_W| = 0.833$,
$f_1/f_W = 0.794$, $M/f_W 0.670$, $|f_2/f_W| = 1.022$,
$\nu_d = 55.60$

TABLE 18

(18th Embodiment)
$2\omega = 81.2°$ to $49.7°$, $F_{NO} = 4.08$ to $7.82$

| | r | d | ν | n |
|---|---|---|---|---|
| 1 | 19.841 | 1.40 | 60.1 | 1.62041 |
| 2 | 7.751 | 3.30 | | |
| 3 | 14.418 | 6.50 | 40.3 | 1.60717 |
| 4 | −23.618 | .70 | | |
| 5 | −15.309 | 3.50 | 39.6 | 1.80454 |
| 6 | 12.359 | 3.50 | 69.9 | 1.51860 |
| 7 | −14.332 | .20 | | |
| 8 | 188.925 | 2.80 | 69.9 | 1.51860 |
| 9 | −11.898 | (d9) | | |
| 10 | −27.400 | 2.60 | 35.2 | 1.74950 |
| 11 | −22.795 | 5.80 | | |
| 12 | −10.233 | 1.30 | 60.0 | 1.64000 |
| 13 | −41.493 | (Bf) | | |

(Variable Interval Upon Zooming)

| f | 24.7000 | 35.0000 | 47.0000 |
|---|---|---|---|
| d9 | 13.1481 | 7.3266 | 3.7623 |
| d13 | 5.6707 | 18.9887 | 34.5049 |

10th Surface (Aspherical Surface)
Cone Constant: $k = .1000 \times 10$
Aspherical Surface Coefficients
$c2 = .0000$, $c4 = -.3906 \times 10^{-4}$, $c6 = -.4141 \times 10^{-6}$,
$c8 = -.1854 \times 10^{-8}$, $c10 = -.3529 \times 10^{-10}$
(Numerical Values Corresponding to Conditions)
$D_2/f_W = 0.133$, $D_3/f_W = 0.263$, $|f_F/f_W| = 0.869$,
$f_1/f_W = 0.787$, $M/f_W 0.696$, $|f_2/f_W| = 1.018$,
$\nu_d = 60.14$

TABLE 19

(19th Embodiment)
$2\omega = 80.9°$ to $49.7°$, $F_{NO} = 3.96$ to $7.60$

| | r | d | ν | n |
|---|---|---|---|---|
| 1 | 21.944 | 1.40 | 60.7 | 1.60311 |
| 2 | 9.227 | 7.41 | | |
| 3 | 15.248 | 5.00 | 42.0 | 1.66755 |
| 4 | −63.535 | 1.50 | | |
| 5 | −22.358 | 3.67 | 40.9 | 1.79631 |
| 6 | 10.488 | 3.50 | 69.9 | 1.51860 |
| 7 | −18.870 | .20 | | |
| 8 | 53.861 | 2.80 | 69.9 | 1.51860 |
| 9 | −14.283 | (d9) | | |
| 10 | −22.342 | 2.30 | 29.5 | 1.71736 |

TABLE 19-continued (19th Embodiment)
$2\omega = 80.9°$ to $49.7°$, $F_{NO} = 3.96$ to $7.60$

| | | | | |
|---|---|---|---|---|
| 11 | −17.827 | 4.95 | | |
| 12 | −10.139 | 1.30 | 52.3 | 1.74810 |
| 13 | −33.026 | (Bf) | | |

(Variable Interval Upon Zooming)

| f | 24.6992 | 35.0000 | 47.0018 |
|---|---|---|---|
| d9 | 13.3720 | 7.5415 | 3.9717 |
| d13 | 5.6017 | 18.8215 | 34.2242 |

10th Surface (Aspherical Surface)
Cone Constant: $k = .1000 \times 10$
Aspherical Surface Coefficients
$c2 = .0000$, $c4 = -.3784 \times 10^{-4}$, $c6 = -.6940 \times 10^{-6}$,
$c8 = -.4462 \times 10^{-8}$, $c10 = -.5012 \times 10^{-10}$
(Numerical Values Corresponding to Conditions)
$D_2/f_W = 0.300$, $D_3/f_W = 0.202$, $|f_F/f_W| = 1.115$,
$f_1/f_W = 0.791$, $M/f_W 0.675$, $|f_2/f_W| = 1.015$,
$\nu_d = 60.64$

TABLE 20

(20th Embodiment)
$2\omega = 81.2°$ to $49.7°$, $F_{NO} = 4.08$ to $7.82$

| | r | d | ν | n |
|---|---|---|---|---|
| 1 | 22.657 | 1.40 | 60.7 | 1.60311 |
| 2 | 8.748 | 6.50 | | |
| 3 | 14.989 | 6.40 | 42.0 | 1.66755 |
| 4 | −41.143 | .70 | | |
| 5 | −20.566 | 3.20 | 40.9 | 1.79631 |
| 6 | 10.219 | 3.50 | 69.9 | 1.51860 |
| 7 | −18.896 | .20 | | |
| 8 | 75.085 | 2.80 | 69.9 | 1.51860 |
| 9 | −13.115 | (d9) | | |
| 10 | −25.378 | 2.60 | 29.5 | 1.71736 |
| 11 | −20.550 | 5.40 | | |
| 12 | −10.144 | 1.30 | 49.5 | 1.74443 |
| 13 | −30.682 | (Bf) | | |

(Variable Interval Upon Zooming)

| f | 24.7000 | 35.0000 | 47.0006 |
|---|---|---|---|
| d9 | 13.3694 | 7.5413 | 3.9729 |
| d13 | 5.6023 | 18.9256 | 34.4481 |

10th Surface (Aspherical Surface)
Cone Constant: $k = .1000 \times 10$
Aspherical Surface Coefficients
$c2 = .0000$, $c4 = -.3777 \times 10^{-4}$, $c6 = -.8613 \times 10^{-6}$,
$c8 = -.7697 \times 10^{-8}$, $c10 = -.6687 \times 10^{-10}$
(Numerical Values Corresponding to Conditions)
$D_2/f_W = 0.263$, $D_3/f_W = 0.259$, $|f_F/f_W| = 0.994$,
$f_1/f_W = 0.787$, $M/f_W 0.680$, $|f_2/f_W| = 1.018$,
$\nu_d = 60.64$

What is claimed is:

1. A wide-angle zoom lens consisting of:
a first lens group having a positive refracting power and a second lens group having a negative refracting power, which are moved relative to each other along an optical axis so as to attain zooming, a lens in the first lens group which is closest to the object side having a convex surface facing the object side,
said first lens group being constituted in turn from the object side by a front group having a negative refracting power and a rear group having a positive refracting power, and being constructed so that the spacing between the front group and the rear group is constant during zooming,
said front group having at least one negative lens, said rear group having at least two positive lenses, and said zoom lens being constituted to satisfy the following conditions:

$$0.75 < |f_F/f_W| \leq 4, f_F < 0$$

$$0.1 < K/f_W < 0.4$$

$$0.1 < L/f_W < 0.7$$

where $f_F$ is the focal length of said front group in said first lens group, $f_W$ is the focal length of said zoom lens at the wide-angle end, K is the axial distance from a lens surface at the extreme image-side end of said first lens group to a rear-side principal point of said first lens group when a direction toward the image side is defined as a positive direction, and L is the axial distance from a lens surface at the extreme object-side end of said front group in said first lens group to a lens surface at the extreme object-side end of said rear group in said first lens group.

2. A wide-angle zoom lens according to claim 1, wherein said rear group in said first lens group includes a positive lens with a convex surface facing the object side, a lens with a concave surface facing the object side, and a positive lens, and
said first lens group is constituted to satisfy the following conditions:

$$0.6 < f_1/f_W < 0.95$$

$$0.38 < M/f_W < 0.86$$

where $f_1$ is the focal length of said first lens group, $f_W$ is the focal length of said zoom lens at the wide-angle end, and M is the axial distance from a lens surface at the extreme object-side end to a lens surface at the extreme image-side end of said rear group in said first lens group.

3. A wide-angle zoom lens according to claim 1, wherein said second lens group has at least one positive lens with a convex surface facing the image side, and at least one negative lens with a concave surface facing the object side, and
said second lens group is constituted to satisfy the following conditions:

$$0.7 < |f_2/f_W| < 1.7, f_2 < 0$$

where $f_2$ is the focal length of said second lens group, and $f_W$ is the focal length of said zoom lens at the wide-angle end.

4. A wide-angle zoom lens according to claim 1, wherein said front group in said first lens group is constituted to satisfy the following condition so as to satisfactorily correct a chromatic aberration of magnification:

$$\nu_d > 50$$

where
$\nu_d$: the Abbe's number of said negative lens in said front group in said first lens group.

5. A wide-angle zoom lens according to claim 1, wherein said front group in said first lens group is constituted by a negative meniscus lens with a convex surface facing the object side, said rear group in said first lens group is constituted by a positive meniscus lens with a convex surface facing the object side, a combination lens which has a negative refracting power, is constituted by combining a double-concave negative lens and a double-convex positive lens, and has a meniscus shape with a concave surface facing the object side as a whole, and a double-convex positive lens, said second lens group is constituted by a positive meniscus lens with a convex surface facing the image side, and a negative meniscus lens with a concave surface facing the object side, and said first lens group is constituted to satisfy the following conditions:

$$0.91 < |f_F/f_W| < 4, f_F < 0$$

$$0.1 < K/f_W < 0.4$$

$$0.1 < L/f_W < 0.7$$

where $f_F$: the focal length of said front group in said first lens group $f_W$: the focal length of said zoom lens at the wide-angle end K: the axial distance from a lens surface at the extreme image-side end of said first lens group to a rear-side principal point of said first lens group when a direction toward the image side is defined as a positive direction in said first lens group L: the axial distance from a lens surface at the extreme object-side end of said front group to a lens surface at the extreme object-side end of said rear group in said first lens group.

6. A wide-angle zoom lens according to claim 5, wherein said rear group in said first lens group is constituted to further satisfy the following conditions:

$$0.6 < f_1/f_W < 0.95$$

$$0.38 < M/f_W < 0.86$$

where $f_1$: the focal length of said first lens group

M: the axial distance from a lens surface at the extreme object-side end to a lens surface at the extreme image-side end of said rear group in said first lens group.

7. A wide-angle zoom lens according to claim 5, wherein said second lens group is constituted to further satisfy the following conditions:

$$0.7 < |f_2/f_W| < 1.7, f_2 < 0$$

where $f_2$: the focal length of the second lens group.

8. A wide-angle zoom lens according to claim 5, wherein said front group in said first lens group is constituted to satisfy the following condition so as to satisfactorily correct a chromatic aberration of magnification:

$$\nu_d > 50$$

where $\nu_d$: the Abbe's number of said negative lens in said front group in said first lens group.

9. A wide-angle zoom lens according to claim 5, wherein said wide-angle zoom lens is constituted according to the following data:

| | $2\omega = 80.9°$ to $65.7°$, $F_{NO} = 4.10$ to $5.65$ | | | |
|---|---|---|---|---|
| | r | d | $\nu$ | n |
| 1 | 22.650 | 1.40 | 57.0 | 1.62280 |
| 2 | 11.723 | 5.00 | | |
| 3 | 13.335 | 2.50 | 40.9 | 1.79631 |
| 4 | 46.542 | 2.00 | | |
| 5 | −15.567 | 3.30 | 40.9 | 1.79631 |
| 6 | 12.959 | 4.00 | 69.9 | 1.51860 |
| 7 | −15.241 | 0.10 | | |
| 8 | 26.064 | 2.00 | 69.9 | 1.51860 |
| 9 | −18.856 | (d9) | | |

-continued

| | r | d | $\nu$ | n |
|---|---|---|---|---|
| 10 | −28.030 | 2.30 | 45.4 | 1.79668 |
| 11 | −21.549 | 6.60 | | |
| 12 | −15.352 | 1.30 | 55.6 | 1.69680 |
| 13 | −123.872 | (Bf) | | |
| (Variable Interval Upon Zooming) | | | | |
| f | 24.7000 | 28.0000 | 34.0000 | |
| d9 | 12.9868 | 9.3127 | 4.4598 | |
| Bf | 4.3908 | 9.6408 | 19.1862 | |

12th Surface (Aspherical Surface)
Cone Constant: k = 1.00
Aspherical Surface Coefficients c2 = 0.0, c4 = −0.2810E-04, c6 = −0.2017E-07,
c8 = −0.1980E-09, c10 = −0.1268E-11
(Numerical Values Corresponding to Conditions)
$|f_F/f_W| = 1.662$, $K/f_W = 0.141$, $L/f_W = 0.259$ where numerals at the left end in the table represent the order from the object side, r is the radius of curvature of a lens surface, d is the lens surface interval, $\nu$ is the Abbe's number, n is the refractive index of the d ray ($\lambda = 587.6$ nm), f is the focal length of the entire system, $2\omega$ is the field angle, and $F_{NO}$ is the f-number;

an aspherical shape is expressed by:

$$X(h) = (h^2/r)/[1 + (1 - kh^2/r^2)^{\frac{1}{2}}] + c2h^2 + c4h^4 + c6h^6 + c8h^8 + c10h^{10}$$

where X(h) is the distance along the optical axis direction from a tangent plane of the vertex of each aspherical surface at a height h in the vertical direction from the optical axis, r is the reference paraxial radius of curvature, k is a cone constant, and cn is an nth-order aspherical surface coefficient; and E-n at the right end in the cone constant k and the nth-order aspherical surface coefficient cn represents $10^{-n}$.

10. A wide-angle zoom lens according to claim 5, wherein said zoom lens is constituted according to the following data:

| | $2\omega = 80.8°$ to $48.5°$, $F_{NO} = 4.01$ to $7.87$ | | | |
|---|---|---|---|---|
| | r | d | $\nu$ | n |
| 1 | 36.582 | 1.40 | 69.9 | 1.51860 |
| 2 | 14.913 | 10.00 | | |
| 3 | 12.918 | 3.00 | 47.1 | 1.67003 |
| 4 | 67.006 | 1.50 | | |
| 5 | −21.100 | 3.30 | 44.7 | 1.80218 |
| 6 | 9.053 | 4.70 | 69.9 | 1.51860 |
| 7 | −22.449 | 1.00 | | |
| 8 | 28.564 | 3.00 | 69.9 | 1.51860 |
| 9 | −15.476 | (d9) | | |
| 10 | −25.423 | 2.30 | 45.4 | 1.79668 |
| 11 | −18.559 | 5.40 | | |
| 12 | −12.104 | 1.30 | 49.4 | 1.77279 |
| 13 | −91.224 | (Bf) | | |
| (Variable Interval Upon Zooming) | | | | |
| f | 24.7000 | 35.0000 | 48.5003 | |
| d9 | 14.7790 | 8.5239 | 4.3486 | |
| Bf | 4.3098 | 16.5718 | 32.6435 | |

11th Surface (Aspherical Surface)
Cone Constant: k = 1.00
Aspherical Surface Coefficients c2 = 0.0, c4 = −0.1125E-05, c6 = −0.2433E-06,
c8 = 0.1205E-08, c10 = −0.7595E-11
(Numerical Values Corresponding to Conditions)
$|f_F/f_W| = 2.010$, $K/f_W = 0.194$, $L/f_W = 0.462$ where numerals at the left end in the table represent the order from the object side, r is the radius of curvature of a lens surface, d is the lens surface interval, $\nu$ is the Abbe's number, n is the refractive index of the d ray ($\lambda = 587.6$ nm), f is the focal length of the entire system, $2\omega$ is the field angle, and $F_{NO}$ is the f-number;

an aspherical shape is expressed by:ps
$$X(h)=(h^2/r)/[1+(1-kh^2/r^2)^{\frac{1}{2}}]+c2h^2+c4h^4+c6h^6+c8h^8+c10h^{10}$$

where X(h) is the distance along the optical axis direction from a tangent plane of the vertex of each aspherical surface at a height h in the vertical direction from the optical axis, r is the reference paraxial radius of curvature, k is a cone constant, and cn is an nth-order aspherical surface coefficient; and E-n at the right end in the cone constant k and the nth-order aspherical surface coefficient cn represents $10^{-n}$.

11. A wide-angle zoom lens according to claim 5, wherein said zoom lens is constituted according to the following data:

| $2\omega = 72.3°$ to $44.5°$, $F_{NO} = 4.50$ to $5.62$ | | | |
|---|---|---|---|
| | r | d | $\nu$ | n |
| 1 | 24.670 | 1.40 | 57.0 | 1.62280 |
| 2 | 13.333 | 7.50 | | |
| 3 | 15.860 | 2.50 | 45.0 | 1.74400 |
| 4 | 82.002 | 2.00 | | |
| 5 | −17.913 | 3.30 | 44.7 | 1.80218 |
| 6 | 13.483 | 4.70 | 70.0 | 1.51860 |
| 7 | −16.789 | 1.00 | | |
| 8 | 29.915 | 3.00 | 70.0 | 1.51860 |
| 9 | −19.657 | (d9) | | |
| 10 | −22.629 | 2.30 | 45.4 | 1.79668 |
| 11 | −16.126 | 4.40 | | |
| 12 | −12.072 | 1.30 | 47.5 | 1.78797 |
| 13 | −64.687 | (Bf) | | |
| (Variable Interval Upon Zooming) | | | |
| f | 28.8068 | 37.9904 | 53.4859 |
| d9 | 14.5448 | 9.1528 | 4.2528 |
| Bf | 8.0716 | 19.8680 | 39.7720 |
| 11th Surface (Aspherical Surface) | | | |
| Cone Constant: k = 1.00 | | | |
| Aspherical Surface Coefficients | | | |
| c2 = 0.0, c4 = −0.3536E-05, c6 = −0.2223E-07, | | | |
| c8 = −0.1381E-09, c10 = −0.1133E-10 | | | |
| (Numerical Values Corresponding to Conditions) | | | |
| $|f_F/f_W| = 1.698$, $K/f_W = 0.163$, $L/f_W = 0.309$ | | | | where numerals at the left end in the table represent the order from the object side, r is the radius of curvature of a lens surface, d is the lens surface interval, $\nu$ is the Abbe's number, n is the refractive index of the d ray ($\lambda = 587.6$ nm), f is the focal length of the entire system, $2\omega$ is the field angle, and $F_{NO}$ is the f-number;

an aspherical shape is expressed by:
$$X(h)=(h^2/r)/[1+(1-kh^2/r^2)^{\frac{1}{2}}]+c2h^2+c4h^4+c6h^6+c8h^8+c10h^{10}$$

where X(h) is the distance along the optical axis direction from a tangent plane of the vertex of each aspherical surface at a height h in the vertical direction from the optical axis, r is the reference paraxial radius of curvature, k is a cone constant, and cn is an nth-order aspherical surface coefficient; and E-n at the right end in the cone constant k and the nth-order aspherical surface coefficient cn represents $10^{-n}$.

12. A wide-angle zoom lens according to claim 5, wherein said zoom lens is constituted according to the following data:

| $2\omega = 72.6°$ to $35.3°$, $F_{NO} = 3.60$ to $8.49$ | | | |
|---|---|---|---|
| | r | d | $\nu$ | n |
| 1 | 25.849 | 1.40 | 57.0 | 1.62280 |
| 2 | 13.482 | 8.20 | | |
| 3 | 14.827 | 3.20 | 47.1 | 1.67003 |
| 4 | 232.513 | 2.00 | | |
| 5 | −17.188 | 3.30 | 44.7 | 1.80218 |
| 6 | 13.072 | 4.70 | 69.9 | 1.51860 |
| 7 | −16.673 | 0.15 | | |
| 8 | 44.207 | 2.70 | 64.1 | 1.51680 |
| 9 | −17.869 | (d9) | | |
| 10 | −38.731 | 3.10 | 31.6 | 1.75692 |
| 11 | −24.465 | 5.00 | | |
| 12 | −11.987 | 1.30 | 43.3 | 1.84042 |
| 13 | −49.324 | (Bf) | | |
| (Variable Interval Upon Zooming) | | | |
| f | 28.8000 | 45.0000 | 67.9005 |
| d9 | 16.2789 | 8.6414 | 4.0621 |
| Bf | 5.5645 | 23.4879 | 48.8245 |
| 10th Surface (Aspherical Surface) | | | |
| Cone Constant: k = 1.00 | | | |
| Aspherical Surface Coefficients | | | |
| c2 = 0.0, c4 = 0.2427E-04, c6 = 0.2213E-06, | | | |
| c8 = 0.1675E-09, c10 = 0.4614E-11 | | | |
| (Numerical Values Corresponding to Conditions) | | | |
| $|f_F/f_W| = 1.642$, $K/f_W = 0.162$, $L/f_W = 0.333$ | | | | where numerals at the left end in the table represent the order from the object side, r is the radius of curvature of a lens surface, d is the lens surface interval, $\nu$ is the Abbe's number, n is the refractive index of the d ray ($\lambda = 587.6$ nm), f is the focal length of the entire system, $2\omega$ is the field angle, and $F_{NO}$ is the f-number;

an aspherical shape is expressed by:
$$X(h)=(h^2/r)/[1+(1-kh^2/r^2)^{\frac{1}{2}}]+c2h^2+c4h^4+c6h^6+c8h^8+c10h^{10}$$

where X(h) is the distance along the optical axis direction from a tangent plane of the vertex of each aspherical surface at a height h in the vertical direction from the optical axis, r is the reference paraxial radius of curvature, k is a cone constant, and cn is an nth-order aspherical surface coefficient; and E-n at the right end in the cone constant k and the nth-order aspherical surface coefficient cn represents $10^{-n}$.

13. A wide-angle zoom lens according to claim 1, wherein said front group in said first lens group is constituted by a negative meniscus lens with a convex surface facing the object side, said rear group in said first lens group is constituted by a positive meniscus lens with a convex surface facing the object side, a combination lens which has a negative refracting power, is constituted by combining a double-concave negative lens and a double-convex positive lens, and has a meniscus shape with a concave surface facing the object side as a whole, and a double-concave positive lens, said second lens group is constituted by three lenses including a positive meniscus lens with a convex surface facing the image side, a negative lens with a concave surface facing the object side whose curvature is stronger than a surface of that lens facing the image side, and a negative meniscus lens with a concave surface facing the object side, and said first lens group is constituted to satisfy the following conditions:

$0.91 < |f_F/f_W| < 4$, $f_F < 0$ $0.1 < K/f_W < 0.4$ $0.1 < L/f_W < 0.7$ where
- $f_F$: the focal length of said front group in said first lens group
- $f_W$: the focal length of said zoom lens at the wide-angle end
- K: the axial distance from a lens surface at the extreme image-side end of said first lens group to a rear-side principal point of said first lens group when a direction toward the image side is defined as a positive direction in said first lens group
- L: the axial distance from a lens surface at the extreme object-side end of said front group to a lens surface at the extreme object-side end of said rear group in said first lens group.

14. A wide-angle zoom lens according to claim 13, wherein said rear group in said first lens group is constituted to further satisfy the following conditions:

$$0.6 < f_1/f_W < 0.95$$

$$0.38 < M/f_W < 0.86$$

where
- $f_1$: the focal length of said first lens group
- M: the axial distance from a lens surface at the extreme object-side end to a lens surface at the extreme image-side end of said rear group in said first lens group.

15. A wide-angle zoom lens according to claim 13, wherein said second lens group is constituted to further satisfy the following conditions:

$$0.7 < |f_2/f_W| < 1.7, f_2 < 0$$

where
- $f_2$: the focal length of the second lens group.

16. A wide-angle zoom lens according to claim 13, wherein said front group in said first lens group is constituted to satisfy the following condition so as to satisfactorily correct a chromatic aberration of magnification:

$$\nu_d < 50$$

where
- $\nu_d$: the Abbe's number of said negative lens in said front group in said first lens group.

17. A wide-angle zoom lens according to claim 13, wherein said zoom lens is constituted according to the following data:

| 2ω = 73.5° to 53.6°, $F_{NO}$ = 3.60 to 5.46 | | | |
|---|---|---|---|
| | r | d | ν | n |
| 1 | 25.764 | 1.40 | 54.0 | 1.61720 |
| 2 | 12.978 | 7.50 | | |
| 3 | 14.053 | 2.90 | 49.4 | 1.77279 |
| 4 | 60.943 | 2.00 | | |
| 5 | −17.855 | 2.80 | 44.7 | 1.80218 |
| 6 | 12.454 | 4.70 | 69.9 | 1.51860 |
| 7 | −19.794 | 0.20 | | |
| 8 | 54.636 | 2.20 | 60.0 | 1.64000 |
| 9 | −18.737 | (d9) | | |
| 10 | −240.704 | 3.80 | 40.9 | 1.79631 |
| 11 | −24.842 | 2.00 | | |
| 12 | −19.268 | 1.00 | 39.6 | 1.80454 |
| 13 | 114.664 | 6.10 | | |
| 14 | −16.000 | 1.20 | 60.1 | 1.62041 |
| 15 | −22.304 | (Bf) | | |
| (Variable Interval Upon Zooming) | | | | |
| f | 28.8000 | 35.0001 | 43.7000 | |
| d9 | 13.3643 | 8.1607 | 3.3486 | |
| Bf | 4.3696 | 13.8675 | 27.1950 | |
| (Numerical Values Corresponding to Conditions) | | | | |
| $|f_F/f_W|$ = 1.535, K/$f_W$ = 0.158, L/$f_W$ = 0.309 | | | | | where numerals at the left end in the table represent the order from the object side, r is the radius of curvature of a lens surface, d is the lens surface interval, ν is the Abbe's number, n is the refractive index of the d ray (λ=587.6 nm), f is the focal length of the entire system, 2ω is the field angle, and $F_{NO}$ is the f-number;

an aspherical shape is expressed by:

$$X(h) = (h^2/r)/[1 + (1 - kh^2/r^2)^{\frac{1}{2}}] + c2h^2 + c4h^4 + c6h^6 + c8h^8 + c10h^{10}$$

where X(h) is the distance along the optical axis direction from a tangent plane of the vertex of each aspherical surface at a height h in the vertical direction from the optical axis, r is the reference paraxial radius of curvature, k is a cone constant, and cn is an nth-order aspherical surface coefficient; and E-n at the right end in the cone constant k and the nth-order aspherical surface coefficient cn represents $10^{-n}$.

18. A wide-angle zoom lens according to claim 13, wherein said zoom lens is constituted according to the following data:

| 2ω = 81.4° to 50.1°, $F_{NO}$ = 4.00 to 7.61 | | | |
|---|---|---|---|
| | r | d | ν | n |
| 1 | 20.276 | 1.40 | 70.1 | 1.51860 |
| 2 | 8.605 | 8.30 | | |
| 3 | 17.141 | 3.00 | 40.4 | 1.60717 |
| 4 | −50.434 | 1.50 | | |
| 5 | −18.928 | 3.30 | 40.9 | 1.79631 |
| 6 | 12.348 | 4.50 | 70.1 | 1.51860 |
| 7 | −15.644 | 0.20 | | |
| 8 | 62.738 | 2.80 | 70.1 | 1.51860 |
| 9 | −15.275 | (d9) | | |
| 10 | −242.922 | 3.00 | 47.1 | 1.67003 |
| 11 | −17.147 | 0.50 | | |
| 12 | −19.696 | 1.30 | 52.3 | 1.74810 |
| 13 | 119.721 | 6.00 | | |
| 14 | −11.661 | 1.20 | 55.6 | 1.69680 |
| 15 | −25.029 | (Bf) | | |
| (Variable Interval Upon Zooming) | | | | |
| f | 24.7000 | 34.9999 | 47.0006 | |
| d9 | 12.7074 | 6.8392 | 3.2462 | |
| d13 | 5.6463 | 19.6368 | 35.9368 | |
| (Numerical Values Corresponding to Conditions) | | | | |
| $|f_F/f_W|$ = 1.217, K/$f_W$ 0.295, L/$f_W$ = 0.393 | | | | | where numerals at the left end in the table represent the order from the object side, r is the radius of curvature of a lens surface, d is the lens surface interval, ν is the Abbe's number, n is the refractive index of the d ray (λ=587.6 nm), f is the focal length of the entire system, 2ω is the field angle, and $F_{NO}$ is the f-number;

an aspherical shape is expressed by:

$$X(h) = (h^2/r)/[1 + (1 - kh^2/r^2)^{\frac{1}{2}}] + c2h^2 + c4h^4 + c6h^6 + c8h^8 + c10h^{10}$$

where X(h) is the distance along the optical axis direction from a tangent plane of the vertex of each aspherical surface at a height h in the vertical direction from the optical axis, r is the reference paraxial radius of curvature, k is a cone constant, and cn is an nth-order aspherical surface coefficient; and E-n at the right end in the cone constant k and the nth-order aspherical surface coefficient cn represents $10^{-n}$.

19. A wide-angle zoom lens according to claim 13, wherein said zoom lens is constituted according to the following data:

| $2\omega = 81.0°$ to $49.9°$, $F_{NO} = 4.01$ to $7.63$ | | | |
|---|---|---|---|
| | r | d | v | n |
| 1 | 16.304 | 1.40 | 55.6 | 1.69680 |
| 2 | 8.307 | 7.78 | | |
| 3 | 18.085 | 3.00 | 38.1 | 1.60342 |
| 4 | −38.197 | 1.50 | | |
| 5 | −17.064 | 4.21 | 40.9 | 1.79631 |
| 6 | 14.089 | 3.50 | 70.1 | 1.51860 |
| 7 | −14.116 | 0.20 | | |
| 8 | 73.360 | 2.50 | 70.1 | 1.51860 |
| 9 | −15.127 | (d9) | | |
| 10 | −187.630 | 4.00 | 48.1 | 1.71700 |
| 11 | −17.504 | 0.50 | | |
| 12 | −19.518 | 1.30 | 52.3 | 1.74810 |
| 13 | 119.152 | 6.00 | | |
| 14 | −12.112 | 1.20 | 54.0 | 1.71300 |
| 15 | −27.416 | (Bf) | | |
| (Variable Interval Upon Zooming) | | | |
| f | 24.7000 | 35.0000 | 47.0000 |
| d9 | 12.7137 | 6.9873 | 3.4812 |
| Bf | 5.8536 | 19.7293 | 35.8952 |
| (Numerical Values Corresponding to Conditions) | | | |
| $|f_F/f_W| = 1.060$, $K/f_W = 0.326$, $L/f_W = 0.372$ | | | | where numerals at the left end in the table represent the order from the object side, r is the radius of curvature of a lens surface, d is the lens surface interval, $v$ is the Abbe's number, n is the refractive index of the d ray ($\lambda = 587.6$ nm), f is the focal length of the entire system, $2\omega$ is the field angle, and $F_{NO}$ is the f-number;

an aspherical shape is expressed by:

$$X(h) = (h^2/r)/[1 + (1 - kh^2/r^2)^{\frac{1}{2}}] + c2h^2 + c4h^4 + c6h^6 + c8h^8 + c10h^{10}$$

where X(h) is the distance along the optical axis direction from a tangent plane of the vertex of each aspherical surface at a height h in the vertical direction from the optical axis, r is the reference paraxial radius of curvature, k is a cone constant, and cn is an nth-order aspherical surface coefficient; and E-n at the right end in the cone constant k and the nth-order aspherical surface coefficient cn represents $10^{-n}$.

20. A wide-angle zoom lens according to claim 1, wherein said front group in said first lens group has a negative lens with a surface facing the image side whose curvature is stronger than a surface of that lens facing the object side, said rear group in said first lens group is constituted by five lenses including two positive lenses with convex surfaces facing the object side, a combination negative lens which is constituted by combining a double-concave negative lens and a double-convex positive lens, and has a meniscus shape with a concave surface facing the object side as a whole, and a double-convex positive lens, and said first lens group is constituted to satisfy the following conditions:

$$0.91 < |f_F/f_W| < 4, f_F < 0$$

$$0.1 < K/f_W < 0.4$$

$$0.1 < L/f_W < 0.7$$

where $f_F$: the focal length of said front group in said first lens group $f_W$: the focal length of said zoom lens at the wide-angle end K: the axial distance from a lens surface at the extreme image-side end of said first lens group to a rear-side principal point of said first lens group when a direction toward the image side is defined as a positive direction in said first lens group L: the axial distance from a lens surface at the extreme object-side end of said front group to a lens surface at the extreme object-side end of said rear group in said first lens group.

21. A wide-angle zoom lens according to claim 20, wherein said rear group in said first lens group is constituted to further satisfy the following condition $$0.6 < f_1/f_W < 0.95$$

$$0.38 < M/f_W < 0.86$$

where $f_1$: the focal length of said first lens group

M: the axial distance from a lens surface at the extreme image-side end to a lens surface at the extreme image-side end of said rear group in said first lens group.

22. A wide-angle zoom lens according to claim 20, wherein said second lens group is constituted to further satisfy the following condition:

$$0.7 < |f_2/f_W| < 1.7, f_2 < 0$$

where $f_2$: the focal length of the second lens group.

23. A wide-angle zoom lens according to claim 20, wherein said front group in said first lens group is constituted to satisfy the following condition so as to satisfactorily correct a chromatic aberration of magnification:

$$v_d > 50$$

where $v_d$: the Abbe's number of said negative lens in said front group in said first lens group.

24. A wide-angle zoom lens according to claim 20, wherein said zoom lens is constituted according to the following data:

| $2 = 73.1°$ to $44.7°$, $F_{NO} = 3.60$ to $6.68$ | | | |
|---|---|---|---|
| | r | d | v | n |
| 1 | 197.859 | 2.00 | 69.9 | 1.51860 |
| 2 | 19.388 | 7.00 | | |
| 3 | 24.521 | 3.00 | 45.9 | 1.54814 |
| 4 | 136.978 | 0.30 | | |
| 5 | 13.789 | 2.70 | 59.0 | 1.51823 |
| 6 | 31.717 | 2.70 | | |
| 7 | −15.651 | 2.50 | 37.3 | 1.83400 |
| 8 | 17.163 | 4.30 | 60.3 | 1.51835 |
| 9 | −12.474 | 0.20 | | |
| 10 | 24.890 | 2.00 | 54.0 | 1.61720 |
| 11 | −47.535 | (d11) | | |
| 12 | −18.716 | 1.90 | 25.5 | 1.80458 |
| 13 | −15.044 | 5.00 | | |
| 14 | −12.495 | 1.30 | 40.9 | 1.79631 |
| 15 | −54.769 | (Bf) | | |

-continued

| (Variable Interval Upon Zooming) | | | |
|---|---|---|---|
| f | 28.8066 | 37.9897 | 53.4836 |
| d11 | 13.7672 | 8.3752 | 3.4752 |
| Bf | 7.7971 | 19.5932 | 39.4958 |

(Numerical Values Corresponding to Conditions)
$|f_F/f_W| = 1.444, K/f_W = 0.138, L/f_W = 0.312$ where numerals at the left end in the table represent the order from the object side, r is the radius of curvature of a lens surface, d is the lens surface interval, v is the Abbe's number, n is the refractive index of the d ray ($\lambda = 587.6$ nm), f is the focal length of the entire system, $2\omega$ is the field angle, and $F_{NO}$ is the f-number;

an aspherical shape is expressed by:

$$X(h) = (h^2/r)/[1+(1-kh^2/r^2)^{\frac{1}{2}}] + c2h^2 + c4h^4 + c6h^6 + c8h^8 + c10h^{10}$$

where X(h) is the distance along the optical axis direction from a tangent plane of the vertex of each aspherical surface at a height h in the vertical direction from the optical axis, r is the reference paraxial radius of curvature, k is a cone constant, and cn is an nth-order aspherical surface coefficient; and E-n at the right end in the cone constant k and the nth-order aspherical surface coefficient cn represents $10^{-n}$.

25. A wide-angle zoom lens according to claim 20, wherein said zoom lens is constituted according to the following data:

| $2\omega = 80.9°$ to $50.1°$, $F_{NO} = 4.00$ to 7.61 | | | |
|---|---|---|---|
| r | d | v | n |
| 1 | 646.314 | 1.40 | 70.1 | 1.51860 |
| 2 | 14.895 | 5.94 | | |
| 3 | 56.368 | 2.00 | 60.8 | 1.56384 |
| 4 | −394.173 | 0.45 | | |
| 5 | 12.463 | 3.00 | 40.4 | 1.60717 |
| 6 | 143.065 | 1.50 | | |
| 7 | −20.295 | 3.30 | 40.9 | 1.79631 |
| 8 | 9.059 | 4.58 | 70.1 | 1.51860 |
| 9 | −22.896 | 0.20 | | |
| 10 | 28.452 | 2.81 | 70.1 | 1.5160 |
| 11 | −15.372 | (d11) | | |
| 12 | −28.348 | 2.30 | 33.9 | 1.80384 |
| 13 | −17.740 | 4.17 | | |
| 14 | −10.896 | 1.30 | 49.4 | 1.77279 |
| 15 | −102.351 | (Bf) | | |

| (Variable Interval Upon Zooming) | | | |
|---|---|---|---|
| f | 24.7000 | 35.0000 | 47.0000 |
| d11 | 13.6683 | 8.0201 | 4.5619 |
| Bf | 5.9493 | 18.3353 | 32.7656 |

13th Surface (Aspherical Surface)
Cone Constant: k = 1.00
Aspherical Surface Coefficients
c2 = 0.0, c4 = −0.1752E-04, c6 = −0.1528E-06,
c8 = 0.1863E-08, c10 = −0.2984E-10
(Numerical Values Corresponding to Conditions)
$|f_F/f_W| = 1.191, K/f_W = 0.195, L/f_W = 0.297$ where numerals at the left end in the table represent the order from the object side, r is the radius of curvature of a lens surface, d is the lens surface interval, v is the Abbe's number, n is the refractive index of the d ray ($\lambda = 587.6$ nm), f is the focal length of the entire system, $2\omega$ is the field angle, and $F_{NO}$ is the f-number;

an aspherical shape is expressed by:

$$X(h) = (h^2/r)/[1+(1-kh^2/r^2)^{\frac{1}{2}}] + c2h^2 + c4h^4 + c6h^6 + c8h^8 + c10h^{10}$$

where X(h) is the distance along the optical axis direction from a tangent plane of the vertex of each aspherical surface at a height h in the vertical direction from the optical axis, r is the reference paraxial radius of curvature, k is a cone constant, and cn is an nth-order aspherical surface coefficient; and E-n at the right end in the cone constant k and the nth-order aspherical surface coefficient cn represents $10^{-n}$.

26. A wide-angle zoom lens according to claim 1, wherein said front group in said first lens group is constituted by two negative lenses including a negative meniscus lens with a convex surface facing the object side, and a double-concave negative lens, and said first lens group is constituted to satisfy the following conditions:

$$0.91 < |f_F/f_W| < 4, f_F < 0$$

$$0.1 < K/f_W < 0.4$$

$$0.1 < L/f_W < 0.7$$

where $f_F$: the focal length of said front group in said first lens group $f_W$: the focal length of said zoom lens at the wide-angle end K: the axial distance from a lens surface at the extreme image-side end of said first lens group to a rear-side principal point of said first lens group when a direction toward the image side is defined as a positive direction in said first lens group L: the axial distance from a lens surface at the extreme object-side end of said front group to a lens surface at the extreme object-side end of said rear group in said first lens group.

27. A wide-angle zoom lens according to claim 26, wherein said rear group in said first lens group is constituted to further satisfy the following conditions:

$$0.6 < f_1/f_W < 0.95$$

$$0.38 < M/f_W < 0.86$$

where $f_1$: the focal length of said first lens group

M: the axial distance from a lens surface at the extreme object-side end to a lens surface at the extreme image-side end of said rear group in said first lens group.

28. A wide-angle zoom lens according to claim 26, wherein said second lens group is constituted to further satisfy the following conditions:

$$0.7 < |f_2/f_W| < 1.7, f_2 < 0$$

where $f_2$: the focal length of the second lens group.

29. A wide-angle zoom lens according to claim 26, wherein said front group in said first lens group is constituted to satisfy the following condition so as to satisfactorily correct a chromatic aberration of magnification:

$$v_d > 50$$

where $v_d$: the Abbe's number of said negative lens in said front group in said first lens group.

30. A wide-angle zoom lens according to claim 26, wherein said zoom lens is constituted according to the following data:

| $2\omega = 72.6°$ to $44.5°$, $F_{NO} = 3.60$ to $6.69$ | | | | |
|---|---|---|---|---|
| | r | d | v | n |
| 1 | 14.054 | 1.40 | 55.6 | 1.69680 |
| 2 | 10.361 | 6.00 | | |
| 3 | −329.940 | 1.40 | 60.1 | 1.62041 |
| 4 | 53.650 | 1.00 | | |
| 5 | 14.357 | 3.30 | 47.1 | 1.67003 |
| 6 | −192.090 | 1.70 | | |
| 7 | −15.831 | 3.50 | 37.3 | 1.83400 |
| 8 | 12.497 | 4.00 | 60.3 | 1.51835 |
| 9 | −19.372 | 0.20 | | |
| 10 | 39.206 | 2.30 | 50.8 | 1.65844 |
| 11 | −17.082 | (d11) | | |
| 12 | −25.204 | 2.30 | 25.5 | 1.80458 |
| 13 | −18.690 | 5.10 | | |
| 14 | −14.000 | 1.30 | 37.3 | 1.83400 |
| 15 | −80.772 | (Bf) | | |
| (Variable Interval Upon Zooming) | | | | |
| f | 28.8067 | 37.9898 | 53.4840 | |
| d11 | 13.8391 | 8.4471 | 3.5471 | |
| Bf | 8.0709 | 19.8670 | 39.7699 | |
| (Numerical Values Corresponding to Conditions) | | | | |
| $|f_F/f_W| = 1.189$, $K/f_W = 0.162$, $L/f_W = 0.340$ | | | | | where numerals at the left end in the table represent the order from the object side, r is the radius of curvature of a lens surface, d is the lens surface interval, $v$ is the Abbe's number, n is the refractive index of the d ray ($\lambda = 587.6$ nm), f is the focal length of the entire system, $2\omega$ is the field angle, and $F_{NO}$ is the f-number;

an aspherical shape is expressed by:

$$X(h) = (h^2/r)/[1+(1-kh^2/r^2)^{\frac{1}{2}}] + c2h^2 + c4h^4 + c6h^6 + c8h^8 + c10h^{10}$$

where X(h) is the distance along the optical axis direction from a tangent plane of the vertex of each aspherical surface at a height h in the vertical direction from the optical axis, r is the reference paraxial radius of curvature, k is a cone constant, and cn is an nth-order aspherical surface coefficient; and E-n at the right end in the cone constant k and the nth-order aspherical surface coefficient cn represents $10^{-n}$.

31. A wide-angle zoom lens according to claim 1, wherein said front group in said first lens group is constituted by a negative meniscus lens with a convex surface facing the object side, said rear group is constituted by five lenses including two positive lenses, a combination negative lens which is constituted by combining a double-concave negative lens and a double-convex positive lens, and has a meniscus shape with a concave surface facing the object side as a whole, and a double-convex positive lens, said second lens group is constituted by three lenses including a positive lens with a surface facing the image side whose curvature is stronger than a surface of that lens facing the object side, a double-concave negative lens, and a negative meniscus lens with a concave surface facing the object side, and said first lens group is constituted to satisfy the following conditions:

$0.91 < |f_F/f_W| < 4$, $f_F < 0$ $0.1 < K/f_W < 0.4$ $0.1 < L/f_W < 0.7$ where $f_F$: the focal length of said front group in said first lens group $f_W$: the focal length of said zoom lens at the wide-angle end K: the axial distance from a lens surface at the extreme image-side end of said first lens group to a rear-side principal point of said first lens group when a direction toward the image side is defined as a positive direction in said first lens group L: the axial distance from a lens surface at the extreme object-side end of said front group to a lens surface at the extreme object-side end of said rear group in said first lens group.

32. A wide-angle zoom lens according to claim 31, wherein said rear group in said first lens group is constituted to further satisfy the following conditions:

$0.6 < f_1/f_W < 0.95$ $0.38 < M/f_W 0.86$ where $f_1$: the focal length of said first lens group M: the axial distance from a lens surface at the extreme object-side end to a lens surface at the extreme image-side end of said rear group in said first lens group.

33. A wide-angle zoom lens according to claim 31, wherein said second lens group is constituted to further satisfy the following conditions:

$0.7 < |f_2|/f_W < 1.7$, $f_2 < 0$ where $f_2$: the focal length of the second lens group.

34. A wide-angle zoom lens according to claim 31, wherein said front group in said first lens group is constituted to satisfy the following condition so as to satisfactorily correct a chromatic aberration of magnification:

$v_d > 50$ where $v_d$: the Abbe's number of said negative lens in said front group in said first lens group.

35. A wide-angle zoom lens according to claim 31, wherein said zoom lens is constituted according to the following data:

| $2\omega = 81.7°$ to $50.4°$, $F_{NO} = 4.00$ to $7.61$ | | | | |
|---|---|---|---|---|
| | r | d | v | n |
| 1 | 48.662 | 1.40 | 70.1 | 1.51860 |
| 2 | 9.559 | 5.94 | | |
| 3 | 100.989 | 2.00 | 60.8 | 1.56384 |
| 4 | 1184.828 | 0.45 | | |
| 5 | 14.417 | 3.00 | 40.4 | 1.60717 |
| 6 | −63.718 | 1.50 | | |
| 7 | −20.049 | 3.30 | 40.9 | 1.79631 |
| 8 | 10.814 | 4.58 | 70.1 | 1.51860 |
| 9 | −18.051 | 0.20 | | |
| 10 | 46.580 | 2.81 | 70.1 | 1.51860 |
| 11 | −15.354 | (d11) | | |
| 12 | −139.781 | 4.00 | 47.1 | 1.67003 |
| 13 | −16.243 | 0.50 | | |
| 14 | −18.624 | 1.30 | 52.3 | 1.74810 |

-continued

| | | | | |
|---|---|---|---|---|
| 15 | 174.141 | 6.00 | | |
| 16 | −11.049 | 1.20 | 49.4 | 1.77279 |
| 15 | −20.995 | (Bf) | | |

(Variable Interval Upon Zooming)

| f | 24.7000 | 35.0000 | 47.0000 |
|---|---|---|---|
| d11 | 12.4919 | 6.8478 | 3.3921 |
| Bf | 5.6032 | 19.4303 | 35.5397 |

(Numerical Values Corresponding to Conditions)

$|f_F/f_W| = 0.940$, $K/f_W = 0.309$, $L/f_W = 0.297$ where numerals at the left end in the table represent the order from the object side, r is the radius of curvature of a lens surface, d is the lens surface interval, $\nu$ is the Abbe's number, n is the refractive index of the d ray ($\lambda = 587.6$ nm), f is the focal length of the entire system, $2\omega$ is the field angle, and $F_{NO}$ is the f-number;

an aspherical shape is expressed by:

$$X(h) = (h^2/r)/[1+(1-kh^2/r^2)^{\frac{1}{2}}] + c2h^2 + c4h^4 + c6h^6 + c8h^8 + c10h^{10}$$

where X(h) is the distance along the optical axis direction from a tangent plane of the vertex of each aspherical surface at a height h in the vertical direction from the optical axis, r is the reference paraxial radius of curvature, k is a cone constant, and cn is an nth-order aspherical surface coefficient; and E-n at the right end in the cone constant k and the nth-order aspherical surface coefficient cn represents $10^{-n}$.

36. A wide-angle zoom lens according to claim 31, wherein said zoom lens is constituted according to the following data:

$2\omega = 80.9°$ TO $50.0°$, $F_{NO} = 4.00$ TO $7.61$

| | r | d | $\nu$ | n |
|---|---|---|---|---|
| 1 | 35.172 | 1.40 | 70.1 | 1.51860 |
| 2 | 11.972 | 10.00 | | |
| 3 | 101.444 | 2.00 | 60.8 | 1.56384 |
| 4 | 125.222 | 0.45 | | |
| 5 | 15.510 | 3.00 | 40.4 | 1.60717 |
| 6 | −121.711 | 1.50 | | |
| 7 | −17.264 | 3.30 | 40.9 | 1.79631 |
| 8 | 11.630 | 4.58 | 70.1 | 1.51860 |
| 9 | −17.516 | 0.20 | | |
| 10 | 36.151 | 2.81 | 64.1 | 1.51680 |
| 11 | −16.330 | (d11) | | |
| 12 | −48.833 | 3.00 | 45.9 | 1.54814 |
| 13 | −21.554 | 0.50 | | |
| 14 | −133.247 | 0.80 | 54.0 | 1.71300 |
| 15 | 92.156 | 6.30 | | |
| 16 | −12.127 | 1.00 | 54.0 | 1.71300 |
| 17 | −42.017 | (Bf) | | |

(Variable Interval Upon Zooming)

| f | 24.6999 | 34.9998 | 46.9997 |
|---|---|---|---|
| d11 | 12.8000 | 7.0459 | 3.5228 |
| Bf | 6.3472 | 19.8374 | 35.5542 |

(Numerical Values Corresponding to Conditions)

$|f_F/f_W| = 1.447$, $K/f_W = 0.324$, $L/f_W = 0.462$ where numerals at the left end in the table represent the order from the object side, r is the radius of curvature of a lens surface, d is the lens surface interval, $\nu$ is the Abbe's number, n is the refractive index of the d ray ($\lambda = 587.6$ nm), f is the focal length of the entire system, $2\omega$ is the field angle, and $F_{NO}$ is the f-number;

an aspherical shape is expressed by:

$$X(h) = (h^2/r)/[1+(1-kh^2/r^2)^{\frac{1}{2}}] + c2h^2 + c4h^4 + c6h^6 + c8h^8 + c10h^{10}$$

where X(h) is the distance along the optical axis direction from a tangent plane of the vertex of each aspherical surface at a height h in the vertical direction from the optical axis, r is the reference paraxial radius of curvature, k is a cone constant, and cn is an nth-order aspherical surface coefficient; and E-n at the right end in the cone constant k and the nth-order aspherical surface coefficient cn represents $10^{-n}$.

37. A wide-angle zoom lens according to claim 1, wherein said front group in said first lens group is constituted by two lenses including a negative lens with a surface facing the image side whose curvature is stronger than a surface of that lens facing the object side, and a positive lens with a surface facing the object side whose curvature is stronger than a surface of that lens facing the image side, and said first lens group is constituted to satisfy the following conditions:

$0.91 < |f_F/f_W| < 4$, $f_F < 0$ $0.1 < K/f_W < 0.4$ $0.1 < L/f_W < 0.7$ where $f_F$: the focal length of said front group in said first lens group $f_W$: the focal length of said zoom lens at the wide-angle end K: the axial distance from a lens surface at the extreme image-side end of said first lens group to a rear-side principal point of said first lens group when a direction toward the image side is defined as a positive direction in said first lens group L: the axial distance from a lens surface at the extreme object-side end of said front group to a lens surface at the extreme object-side end of said rear group in said first lens group.

38. A wide-angle zoom lens according to claim 37, wherein said rear group in said first lens group is constituted to further satisfy the following conditions:

$0.6 < f_1/f_W < 0.95$ $0.38 < M/f_W < 0.86$ where $f_1$: the focal length of said first lens group M: the axial distance from a lens surface at the extreme object-side end to a lens surface at the extreme image-side end of said rear group in said first lens group.

39. A wide-angle zoom lens according to claim 37, wherein said second lens group is constituted to further satisfy the following conditions:

$0.7 < |f_2/f_W| < 1.7$, $f_2 < 0$ where $f_2$: the focal length of the second lens group.

40. A wide-angle zoom lens according to claim 37, wherein said front group in said first lens group is constituted to satisfy the following condition so as to satisfactorily correct a chromatic aberration of magnification:

$\nu_d > 50$ where $\nu_d$: the Abbe's number of said negative lens in said front group in said first lens group.

41. A wide-angle zoom lens according to claim 37, wherein said zoom lens is constituted according to the following data:

| 2ω = 81.0° to 50.5°, $F_{NO}$ = 4.01 to 7.63 | | | | |
|---|---|---|---|---|
| | r | d | ν | n |
| 1 | −757.521 | 1.40 | 70.1 | 1.51860 |
| 2 | 14.921 | 2.63 | | |
| 3 | 45.833 | 2.00 | 56.0 | 1.56883 |
| 4 | −1758.247 | 2.00 | | |
| 5 | 12.814 | 3.00 | 47.1 | 1.62374 |
| 6 | 92.013 | 1.50 | | |
| 7 | −20.683 | 3.30 | 44.7 | 1.80218 |
| 8 | 8.793 | 4.58 | 70.1 | 1.51860 |
| 9 | −21.405 | 1.00 | | |
| 10 | 23.137 | 2.81 | 70.1 | 1.51860 |
| 11 | −15.554 | (d11) | | |
| 12 | −27.213 | 2.30 | 40.9 | 1.79631 |
| 13 | −16.225 | 3.83 | | |
| 14 | −10.450 | 1.30 | 49.4 | 1.77279 |
| 15 | −113.948 | (Bf) | | |

| (Variable Interval Upon Zooming) | | | |
|---|---|---|---|
| f | 24.7000 | 35.0000 | 47.0000 |
| d11 | 13.5916 | 7.9956 | 4.5693 |
| Bf | 6.0474 | 18.3524 | 32.6884 |

13th Surface (Aspherical Surface)
Cone Constant: k = 1.00
Aspherical Surface Coefficients
c2 = 0.0, c4 = −0.1305E-04, c6 = −0.2596E-06,
c8 = 0.5319E-08, c10 = −0.5783E-10

(Numerical Values Corresponding to Conditions)
$|f_F/f_W|$ = 1.881, K/$f_W$ = 0.184, L/$f^W$ = 0.325 where numerals at the left end in the table represent the order from the object side, r is the radius of curvature of a lens surface, d is the lens surface interval, ν is the Abbe's number, n is the refractive index of the d ray (λ=587.6 nm), f is the focal length of the entire system, 2ω is the field angle, and $F_{NO}$ is the f-number;

an aspherical shape is expressed by:

$$X(h) = (h^2/r)/[1+(1-kh^2/r^2)^{\frac{1}{2}}] + c2h^2 + c4h^4 + c6h^6 + c8h^8 + c10h^{10}$$

where X(h) is the distance along the optical axis direction from a tangent plane of the vertex of each aspherical surface at a height h in the vertical direction from the optical axis, r is the reference paraxial radius of curvature, k is a cone constant, and cn is an nth-order aspherical surface coefficient; and E-n at the right end in the cone constant k and the nth-order aspherical surface coefficient cn represents $10^{-n}$.

42. A wide-angle zoom lens comprising:
a first lens group having a positive refracting power and a second lens group having a negative refracting power, which are moved relative to each other along an optical axis so as to attain zooming, a lens in the first lens group which is closest to the object side having a convex surface facing the object side,
said first lens group being constituted in turn from the object side by a front group having a negative refracting power and a rear group having a positive refracting power, and being constructed so that the spacing between the front group and the rear group is constant during zooming,
said front group having at least one negative lens,
said rear group having at least two positive lenses, and
said zoom lens being constituted to satisfy the following conditions:

$0.1 < D_2/f_W < 0.4$ $0.2 < D_3/f_W < 0.4$ $0.75 < |f_F/f_W| < 4; f_F < 0$ where $f_F$ is the focal length of said front group in said first lens group, $f_W$ is the focal length of said zoom lens at the wide-angle end, $D_2$ is the axial distance from a lens surface at the extreme image-side end in said front group to a lens surface at the extreme object-side end in said rear group in said first lens group, and $D_3$ is the central thickness of said positive lens at the extreme object-side end in said rear group in said first lens group.

43. A wide-angle zoom lens according to claim 42, wherein said rear group in said first lens group has a positive lens with a convex surface facing the object side, a lens with a concave surface facing the object side, and a positive lens, and is constituted to satisfy the following conditions:

$0.6 < f_1/f_W < 0.95$ $0.38 < M/f_W < 0.86$ where
$f_1$: the focal length of said first lens group
M: the axial distance from a lens surface at the extreme object-side end to a lens surface at the extreme image-side end of said rear group in said first lens group.

44. A wide-angle zoom lens according to claim 42, wherein said second lens group has a positive lens with a convex surface facing the image side, and a negative lens with a concave surface facing the object side in turn from the object side, and is constituted to satisfy the following conditions:

$0.7 < |f_2/f_W| < 1.7; f_2 < 0$ where
$f_2$: the focal length of the second lens group.

45. A wide-angle zoom lens according to claim 42, wherein said front group in said first lens group is constituted to satisfy the following condition so as to satisfactorily correct a chromatic aberration of magnification:

$\nu_d > 50$ where
$\nu_d$: the Abbe's number of said negative lens in said front group in said first lens group.

46. A wide-angle zoom lens according to claim 42, wherein said front group in said first lens group is constituted by a negative meniscus lens with a convex surface facing the object side, said rear group in said first lens group is constituted by a double-convex positive lens, a combination negative lens which is a combination lens of a double-concave negative lens and a double-convex positive lens, and has a meniscus shape with a concave surface facing the object side as a whole, and a double-convex positive lens, said second lens group is constituted by a positive meniscus lens with a convex surface facing the image side, and a negative meniscus lens with a concave surface facing the object side, and said first and second lens groups are constituted to satisfy the following conditions:

$$0.1 < D_2/f_W < 0.4$$

$$0.2 < D_3/f_W < 0.4$$

$$0.75 < |f_F/f_W| < 1.12; f_F < 0$$

where $f_F$: the focal length of said front group in said first lens group $f_W$: the focal length of said zoom lens at the wide-angle end $D_2$: the axial distance from a lens surface at the extreme image-side end in said front group to a lens surface at the extreme object-side end in said rear group in said first lens group $D_3$: the central thickness of said positive lens at the extreme object-side end in said rear group in said first lens group.

47. A wide-angle zoom lens according to claim 46, wherein said rear group in said first lens group is constituted to satisfy the following conditions:

$$0.6 < f_1/f_W < 0.95$$

$$0.38 < M/f_W < 0.86$$

where, $f_1$: the focal length of said first lens group

M: the axial distance from a lens surface at the extreme object-side end to a lens surface at the extreme image-side end of said rear group in said first lens group.

48. A wide-angle zoom lens according to claim 46, wherein said second lens group is constituted to satisfy the following conditions:

$$0.7 < |f_2/f_W| < 1.7; f_2 < 0$$

where $f_2$: the focal length of the second lens group.

49. A wide-angle zoom lens according to claim 46, wherein said front group in said first lens group is constituted to satisfy the following condition so as to satisfactorily correct a chromatic aberration of magnification:

$$\nu_d > 50$$

where $\nu_d$: the Abbe's number of said negative lens in said front group in said first lens group.

50. A wide-angle zoom lens according to claim 46, wherein said zoom lens is constituted according to the following data:

| 2ω = 81.3° to 49.9, $F_{NO}$ = 4.08 to 7.82 | | | |
|---|---|---|---|
| r | d | ν | n |
| 1 | 21.435 | 1.40 | 55.6 | 1.69680 |
| 2 | 8.392 | 3.30 | | |
| 3 | 11.239 | 5.40 | 41.4 | 1.57501 |
| 4 | −29.971 | .70 | | |
| 5 | −14.229 | 3.50 | 40.9 | 1.79631 |
| 6 | 11.077 | 3.80 | 69.9 | 1.51860 |
| 7 | −14.555 | .20 | | |
| 8 | 47.678 | 2.80 | 69.9 | 1.51860 |
| 9 | −13.366 | (d9) | | |
| 10 | −27.913 | 2.60 | 49.4 | 1.74240 |
| 11 | −19.186 | 4.60 | | |
| 12 | −10.455 | 1.30 | 60.0 | 1.64000 |
| 13 | −95.825 | (Bf) | | |

| (Variable Interval Upon Zooming) | | | |
|---|---|---|---|
| f | 24.7000 | 35.0000 | 47.0000 |
| d9 | 13.2523 | 7.3493 | 3.7351 |
| d13 | 6.3891 | 19.7808 | 35.3828 |

10th Surface (Aspherical Surface)
Cone Constant: $k = .1000 \times 10$
Aspherical Surface Coefficients
$c2 = .0000, c4 = .3439 \times 10^{-4}, c6 = .1040 \times 10^{-6},$
$c8 = .1110 \times 10^{-8}, c10 = .1862 \times 10^{-10}$ (Numerical Values Corresponding to Conditions)
$D_2/f_W = 0.133, D_3/f_W = 0.219, |f_F/f_W| = 0.838$ where numerals at the left end in the table represent the order from the object side, r is the radius of curvature of a lens surface, d is the lens surface interval, ν is the Abbe's number, n is the refractive index of the d ray (λ=587.6 nm), f is the focal length of the entire system, 2ω is the field angle, and $F_{NO}$ is the f-number;

an aspherical shape is expressed by:

$$X(h) = (h^2/r)/[1+(1-kh^2/r^2)^{\frac{1}{2}}] + c2h^2 + c4h^4 + c6h^6 + c8h^8 + c10h^{10}$$

where X(h) is the distance along the optical axis direction from a tangent plane of the vertex of each aspherical surface at a height h in the vertical direction from the optical axis, r is the reference paraxial radius of curvature, k is a cone constant, and cn is an nth-order aspherical surface coefficient; and E-n at the right end in the cone constant k and the nth-order aspherical surface coefficient cn represents $10^{-n}$.

51. A wide-angle zoom lens according to claim 46, wherein said zoom lens is constituted according to the following data:

| 2ω = 81.2° to 50.1°, $F_{NO}$ = 4.08 to 7.83 | | | |
|---|---|---|---|
| r | d | ν | n |
| 1 | 23.130 | 1.40 | 55.6 | 1.69680 |
| 2 | 8.440 | 3.70 | | |
| 3 | 11.773 | 6.50 | 40.7 | 1.58144 |
| 4 | −32.846 | 1.00 | | |
| 5 | −14.205 | 2.50 | 40.9 | 1.79631 |
| 6 | 10.542 | 3.90 | 69.9 | 1.51860 |
| 7 | −14.401 | .20 | | |
| 8 | 41.295 | 2.40 | 69.9 | 1.51860 |
| 9 | −12.855 | (d9) | | |
| 10 | −22.495 | 2.60 | 49.4 | 1.74240 |
| 11 | −16.826 | 4.70 | | |
| 12 | −10.290 | 1.30 | 60.0 | 1.64000 |
| 13 | −68.640 | (Bf) | | |

| (Variable Interval Upon Zooming) | | | |
|---|---|---|---|
| f | 24.7000 | 35.0000 | 47.0000 |
| d9 | 13.2618 | 7.3674 | 3.7585 |
| d13 | 7.0341 | 21.0606 | 37.4022 |

10th Surface (Aspherical Surface)
Cone Constant: $k = .1000 \times 10$
Aspherical Surface Coefficients
$c2 = .0000, c4 = .3149 \times 10^{-4}, c6 = .2485 \times 10^{-7},$
$c8 = .3372 \times 10^{-8}, c10 = .8716 \times 10^{-11}$ (Numerical Values Corresponding to Conditions)
$D_2/f_W = .150, D_3/f_W = 0.263, |f_F/f_W| = 0.804$ where numerals at the left end in the table represent the order from the object side, r is the radius of curvature of a lens surface, d is the lens surface interval, ν is the Abbe's number, n is the refractive index of the d ray ($\lambda = 587.6$ nm), f is the focal length of the entire system, $2\omega$ is the field angle, and $F_{NO}$ is the f-number;

an aspherical shape is expressed by:

$$X(h) = (h^2/r)/[1+(1-kh^2/r^2)^{\frac{1}{2}}] + c2h^2 + c4h^4 + c6h^6 + c8h^8 + c10h^{10}$$

where X(h) is the distance along the optical axis direction from a tangent plane of the vertex of each aspherical surface at a height h in the vertical direction from the optical axis, r is the reference paraxial radius of curvature, k is a cone constant, and cn is an nth-order aspherical surface coefficient; and E-n at the right end in the cone constant k and the nth-order aspherical surface coefficient cn represents $10^{-n}$.

52. A wide-angle zoom lens according to claim 46, wherein said zoom lens is constituted according to the following data:

| $2\omega = 81.3°$ to 49.9°, $F_{NO} = 4.10$ to 7.87 | | | |
|---|---|---|---|
| r | d | ν | n |
| 1 | 23.277 | 1.40 | 55.6 | 1.69680 |
| 2 | 8.166 | 3.30 | | |
| 3 | 11.365 | 5.60 | 40.7 | 1.58144 |
| 4 | −25.499 | .70 | | |
| 5 | −13.771 | 3.60 | 40.9 | 1.79631 |
| 6 | 10.503 | 3.50 | 69.9 | 1.51860 |
| 7 | −15.096 | .20 | | |
| 8 | 51.118 | 2.80 | 69.9 | 1.51860 |
| 9 | −12.204 | (d9) | | |
| 10 | −29.253 | 2.60 | 49.2 | 1.74330 |
| 11 | −19.555 | 4.80 | | |
| 12 | −10.668 | 1.30 | 60.0 | 1.64000 |
| 13 | −122.254 | (Bf) | | |

(Variable Interval Upon Zooming)

| f | 24.7000 | 35.0000 | 47.0000 |
|---|---|---|---|
| d9 | 13.3040 | 7.3914 | 3.7713 |
| d13 | 7.0230 | 20.7253 | 36.6891 |

10th Surface (Aspherical Surface)
Cone Constant: $k = .1000 \times 10$
Aspherical Surface Coefficients
$c2 = .0000$, $c4 = .2758 \times 10^{-4}$, $c6 = .1565 \times 10^{-6}$,
$c8 = .1325 \times 10^{-8}$, $c10 = .6892 \times 10^{-11}$ (Numerical Values Corresponding to Conditions)

$D_2/f_W = 0.133$, $D_3/f_W = 0.227$, $|f_F/f_W| = 0.760$ where numerals at the left end in the table represent the order from the object side, r is the radius of curvature of a lens surface, d is the lens surface interval, μ is the Abbe's number, n is the refractive index of the d ray ($\lambda = 587.6$ nm), f is the focal length of the entire system, $2\omega$ is the field angle, and $F_{NO}$ is the f-number;

an aspherical shape is expressed by:

$$X(h) = (h^2/r)/[1+(1-kh^2/r^2)^{\frac{1}{2}}] + c2h^2 + c4h^4 + c6h^6 + c8h^8 + c10h^{10}$$

where X(h) is the distance along the optical axis direction from a tangent plane of the vertex of each aspherical surface at a height h in the vertical direction from the optical axis, r is the reference paraxial radius of curvature, k is a cone constant, and cn is an nth-order aspherical surface coefficient; and E-n at the right end in the cone constant k and the nth-order aspherical surface coefficient cn represents $10^{-n}$.

53. A wide-angle zoom lens according to claim 46, wherein said zoom lens is constituted according to the following data:

| $2\omega = 81.2°$ to 49.8°, $F_{NO} = 4.08$ to 7.82 | | | |
|---|---|---|---|
| r | d | ν | n |
| 1 | 22.065 | 1.40 | 55.6 | 1.69680 |
| 2 | 8.464 | 3.30 | | |
| 3 | 11.325 | 5.74 | 41.4 | 1.57501 |
| 4 | −30.545 | .70 | | |
| 5 | −14.108 | 3.61 | 40.9 | 1.79631 |
| 6 | 11.555 | 3.50 | 69.9 | 1.51860 |
| 7 | −14.313 | .20 | | |
| 8 | 46.612 | 2.80 | 69.9 | 1.51860 |
| 9 | −13.494 | (d9) | | |
| 10 | −26.529 | 2.60 | 45.0 | 1.74400 |
| 11 | −19.655 | 5.07 | | |
| 12 | −10.609 | 1.30 | 60.0 | 1.64000 |
| 13 | −78.447 | (Bf) | | |

(Variable Interval Upon Zooming)

| f | 24.7000 | 35.0000 | 47.0000 |
|---|---|---|---|
| d9 | 13.2718 | 7.3725 | 3.7606 |
| d13 | 5.9704 | 19.2136 | 34.6425 |

10th Surface (Aspherical Surface)
Cone Constant: $k = .1000E \times 10$
Aspherical Surface Coefficients
$c2 = .0000$, $c4 = .3207 \times 10^{-4}$, $c6 = .1167 \times 10^{-6}$,
$c8 = .1127 \times 10^{-8}$, $c10 = .1492 \times 10^{-10}$ (Numerical Values Corresponding to Conditions)

$D_2/f_W = 0.133$, $D_3/f_W = 0.232$, $|f_F/f_W| = 0.833$ where numerals at the left end in the table represent the order from the object side, r is the radius of curvature of a lens surface, d is the lens surface interval, v is the Abbe's number, n is the refractive index of the d ray ($\lambda = 587.6$ nm), f is the focal length of the entire system, $2\omega$ is the field angle, and $F_{NO}$ is the f-number;

an aspherical shape is expressed by:

$$X(h) = (h^2/r)/[1+(1-kh^2/r^2)^{\frac{1}{2}}] + c2h^2 + c4h^4 + c6h^6 + c8h^8 + c10h^{10}$$

where X(h) is the distance along the optical axis direction from a tangent plane of the vertex of each aspherical surface at a height h in the vertical direction from the optical axis, r is the reference paraxial radius of curvature, k is a cone constant, and cn is an nth-order aspherical surface coefficient; and E-n at the right end in the cone constant k and the nth-order aspherical surface coefficient cn represents $10^{-n}$.

54. A wide-angle zoom lens according to claim 46, wherein said zoom lens is constituted according to the following data:

| $2\omega = 81.2°$ to 49.7°, $F_{NO} = 4.08$ to 7.82 | | | |
|---|---|---|---|
| r | d | ν | n |
| 1 | 19.841 | 1.40 | 60.1 | 1.62041 |
| 2 | 7.751 | 3.30 | | |
| 3 | 14.418 | 6.50 | 40.3 | 1.60717 |
| 4 | −23.618 | .70 | | |
| 5 | −15.309 | 3.50 | 39.6 | 1.80454 |
| 6 | 12.359 | 3.50 | 69.9 | 1.51860 |
| 7 | −14.332 | .20 | | |
| 8 | 188.925 | 2.80 | 69.9 | 1.51860 |
| 9 | −11.898 | (d9) | | |
| 10 | −27.400 | 2.60 | 35.2 | 1 74950 |
| 11 | −22.795 | 5.80 | | |
| 12 | −10.233 | 1.30 | 60.0 | 1.64000 |
| 13 | −41.937 | (Bf) | | |

(Variable Interval Upon Zooming)

| f | 24.7000 | 35.0000 | 47.0000 |
|---|---|---|---|
| d9 | 13.1481 | 7.3266 | 3.7623 |
| d13 | 5.6707 | 18.9887 | 34.5049 |

10th Surface (Aspherical Surface)
Cone Constant: $k = .1000 \times 10$

-continued

Aspherical Surface Coefficients
$c2 = .0000$, $c4 = .3906 \times 10^{-4}$, $c6 = .4141 \times 10^{-6}$,
$c8 = -.1854 \times 10^{-8}$, $c10 = .3529 \times 10^{-10}$ (Numerical Values Corresponding to Conditions)
$D_2/f_W = 0.133$, $D_3/f_W = 0.263$, $|f_F/f_W| = 0.869$ where numerals at the left end in the table represent the order from the object side, r is the radius of curvature of a lens surface, d is the lens surface interval, $\nu$ is the Abbe's number, n is the refractive index of the d ray ($\lambda = 587.6$ nm), f is the focal length of the entire system, $2\omega$ is the field angle, and $F_{NO}$ is the f-number;

an aspherical shape is expressed by:

$$X(h) = (h^2/r)/[1+(1-kh^2/r^2)^{\frac{1}{2}}] + c2h^2 + c4h^4 + c6h^6 + c8h^8 + c10h^{10}$$

where X(h) is the distance along the optical axis direction from a tangent plane of the vertex of each aspherical surface at a height h in the vertical direction from the optical axis, r is the reference paraxial radius of curvature, k is a cone constant, and cn is an nth-order aspherical surface coefficient; and E-n at the right end in the cone constant k and the nth-order aspherical surface coefficient cn represents $10^{-n}$.

55. A wide-angle zoom lens according to claim 46, wherein said zoom lens is constituted according to the following data:

| $2\omega = 80.9°$ to $49.7°$, $F_{NO} = 3.96$ to $7.60$ | | | |
|---|---|---|---|
| r | d | $\nu$ | n |
| 1  21.944 | 1.40 | 60.7 | 1.60311 |
| 2   9.227 | 7.41 | | |
| 3  15.248 | 5.00 | 42.0 | 1.66755 |
| 4 −63.535 | 1.50 | | |
| 5 −22.358 | 3.67 | 40.9 | 1.79631 |
| 6  10.488 | 3.50 | 69.9 | 1.51860 |
| 7 −18.870 | .20 | | |
| 8   5.861 | 2.80 | 69.9 | 1.51860 |
| 9 −14.283 | (d9) | | |
| 10 −22.342 | 2.30 | 29.5 | 1.71736 |
| 11 −17.827 | 4.95 | | |
| 12 −10.139 | 1.30 | 52.3 | 1.74810 |
| 13 −33.026 | (Bf) | | |

(Variable Interval Upon Zooming)
| f | 24.6992 | 35.0000 | 47.0018 |
| d9 | 13.3720 | 7.5415 | 3.9717 |
| d13 | 5.6017 | 18.8215 | 34.2242 |

10th Surface (Aspherical Surface)
Cone Constant: $k = .1000 \times 10$
Aspherical Surface Coefficients
$c2 = .0000$, $c4 = .3784 \times 10^{-4}$, $c6 = .6940 \times 10^{-6}$,
$c8 = -.4462 \times 10^{-8}$, $c10 = .5012 \times 10^{-10}$ (Numerical Values Corresponding to Conditions)
$D_2/f_W = .300$, $D_3/f_W = 0.202$, $|f_F/f_W| = 1.115$ where numerals at the left end in the table represent the order from the object side, r is the radius of curvature of a lens surface, d is the lens surface interval, $\nu$ is the Abbe's number, n is the refractive index of the d ray ($\lambda = 587.6$ nm), f is the focal length of the entire system, $2\omega$ is the field angle, and $F_{NO}$ is the f-number;

an aspherical shape is expressed by:

$$X(h) = (h^2/r)/[1+(1-kh^2/r^2)^{\frac{1}{2}}] + c2h^2 + c4h^4 + c6h^6 + c8h^8 + c10h^{10}$$

where X(h) is the distance along the optical axis direction from a tangent plane of the vertex of each aspherical surface at a height h in the vertical direction from the optical axis, r is the reference paraxial radius of curvature, k is a cone constant, and cn is an nth-order aspherical surface coefficient; and E-n at the right end in the cone constant k and the nth-order aspherical surface coefficient cn represents $10^{-n}$.

56. A wide-angle zoom lens according to claim 46, wherein said zoom lens is constituted according to the following data:

| $2\omega = 81.2°$ to $49.8°$, $F_{NO} = 4.00$ to $7.66$ | | | |
|---|---|---|---|
| r | d | $\nu$ | n |
| 1  22.657 | 1.40 | 60.7 | 1.60311 |
| 2   8.748 | 6.5 | | |
| 3  14.989 | 6.40 | 42.0 | 1.66755 |
| 4 −41.143 | .70 | | |
| 5 −20.566 | 3.20 | 40.9 | 1.79631 |
| 6  10.219 | 3.50 | 69.9 | 1.51860 |
| 7 −18.896 | .20 | | |
| 8  75.085 | 2.80 | 69.9 | 1.51860 |
| 9 −13.115 | (d9) | | |
| 10 −25.378 | 2.60 | 29.5 | 1.71736 |
| 11 −20.550 | 5.40 | | |
| 12 −10.144 | 1.30 | 49.5 | 1.74443 |
| 13 −30.682 | (Bf) | | |

(Variable Interval Upon Zooming)
| f | 24.7000 | 35.0002 | 47.0006 |
| d9 | 13.3694 | 7.5413 | 3.9729 |
| d13 | 5.6023 | 18.9256 | 34.4481 |

10th Surface (Aspherical Surface)
Cone Constant: $k = .1000 \times 10$
Aspherical Surface Coefficients
$c2 = .0000$, $c4 = .3777 \times 10^{-4}$, $c6 = .8613 \times 10^{-6}$,
$c8 = -.7697 \times 10^{-8}$, $c10 = .6687 \times 10^{-10}$ (Numerical Values Corresponding to Conditions)
$D_2/f_W = 0.263$, $D_3/f_W = 0.259$, $|f_F/f_W| = 0.994$ where numerals at the left end in the table represent the order from the object side, r is the radius of curvature of a lens surface, d is the lens surface interval, $\nu$ is the Abbe's number, n is the refractive index of the d ray ($\lambda = 587.6$ nm), f is the focal length of the entire system, $2\omega$ is the field angle, and $F_{NO}$ is the f-number;

an aspherical shape is expressed by:

$$X(h) = (h^2/r)/[1+(1-kh^2/r^2)^{\frac{1}{2}}] + c2h^2 + c4h^4 + c6h^6 + c8h^8 + c10h^{10}$$

where X(h) is the distance along the optical axis direction from a tangent plane of the vertex of each aspherical surface at a height h in the vertical direction from the optical axis, r is the reference paraxial radius of curvature, k is a cone constant, and cn is an nth-order aspherical surface coefficient; and E-n at the right end in the cone constant k and the nth-order aspherical surface coefficient cn represents $10^{-n}$.

57. A wide-angle zoom lens consisting of:
a first lens group having a positive refracting power and a second lens group having a negative refracting power, which are moved relative to each other along an optical axis so as to attain zooming,
said first lens group being provided with a lens surface convex to the object side and positioned nearest the object side, and being constituted in turn from the object side by a front group having a negative refracting power and a rear group having a positive refracting power, and being constructed so that the spacing between said front group and said rear group is constant during zooming, said front group having at least one negative lens,
said rear group having at least two positive lenses, and
said zoom lens being constituted to satisfy the following condition:

$0.1 < K/f_W < 0.4$ where $f_W$ is the focal length of said zoom lens at the wide-angle end, and K is the axial distance from a lens surface at the extreme image-side end of said first lens group to a rear-side principal point of said first lens group when a direction toward the image side is defined as a positive direction.

* * * * *